US007080783B2

(12) United States Patent
Dilday et al.

(10) Patent No.: US 7,080,783 B2
(45) Date of Patent: Jul. 25, 2006

(54) DATA STORAGE CARD HAVING BOTH LINEAR AND ANNULAR DATA REGIONS

(75) Inventors: Robert Burr Dilday, San Juan Capistrano, CA (US); Timothy Scarafiotti, Scottsdale, AZ (US); Brett Gregor, Newport Coast, CA (US)

(73) Assignee: Digital Castles LLC, Newport Beach, CA (US)

( * ) Notice: Subject to any disclaimer, the term of this patent is extended or adjusted under 35 U.S.C. 154(b) by 57 days.

(21) Appl. No.: 10/300,428

(22) Filed: Nov. 20, 2002

(65) Prior Publication Data

US 2003/0132300 A1 Jul. 17, 2003

Related U.S. Application Data

(63) Continuation-in-part of application No. 09/655,976, filed on Sep. 5, 2000, now Pat. No. 6,484,940.

(51) Int. Cl.
*G06K 7/10* (2006.01)
(52) U.S. Cl. .................. 235/454; 235/492; 235/493
(58) Field of Classification Search ............ 235/492, 235/380, 375, 449, 453, 454; 369/14, 273
See application file for complete search history.

(56) References Cited

U.S. PATENT DOCUMENTS 4,868,373 A * 9/1989 Opheij et al. ............... 235/380
6,021,030 A * 2/2000 Weinberger et al. ........ 360/133
6,510,124 B1* 1/2003 Wood .......................... 369/273
6,513,709 B1* 2/2003 Hansen ....................... 235/380
6,542,444 B1* 4/2003 Rutsche ....................... 369/14
6,561,420 B1* 5/2003 Tsai et al. ................... 235/449
6,581,839 B1* 6/2003 Lasch et al. ................ 235/487
6,616,052 B1* 9/2003 Tseng et al. ................ 235/487
6,760,280 B1* 7/2004 Schoppe ...................... 369/14

\* cited by examiner

*Primary Examiner*—Ahshik Kim
(74) *Attorney, Agent, or Firm*—Stetina Brunda Garred & Brucker

(57) ABSTRACT

A data storage card that includes a card body, an aperture, an optical storage region, and a magnetic storage region. The card is formed to cooperatively engage both a drive mechanism of a magnetic stripe reader and a drive mechanism of an optical data reader. In one embodiment, the card includes a resiliently displaceable cover member that automatically moves in and out of the aperture for proper use in various data readers. Also, in one embodiment, the optical data region is formed on a film to reduce the thickness of the card. Moreover, in one embodiment, the card includes a semiconductor and a counterbalance weight. Also, the card includes a spacer for abutting against components in a optical data reader in one embodiment. Finally, in one embodiment, the aperture is smaller than standard optical data discs so as to cause proper abutment against members of the optical data reader.

17 Claims, 17 Drawing Sheets

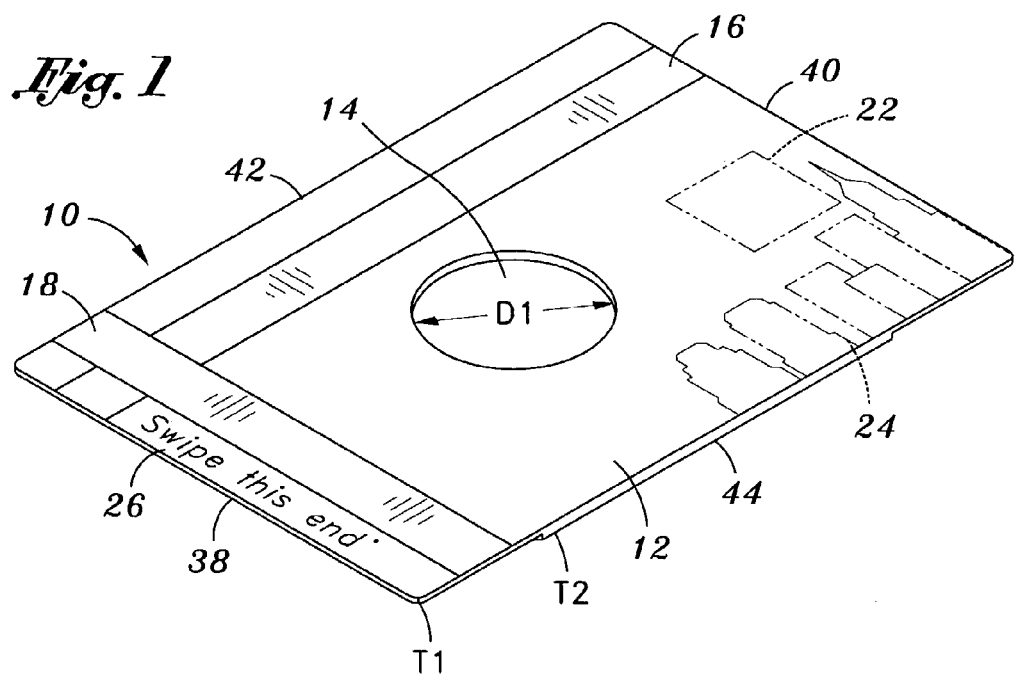
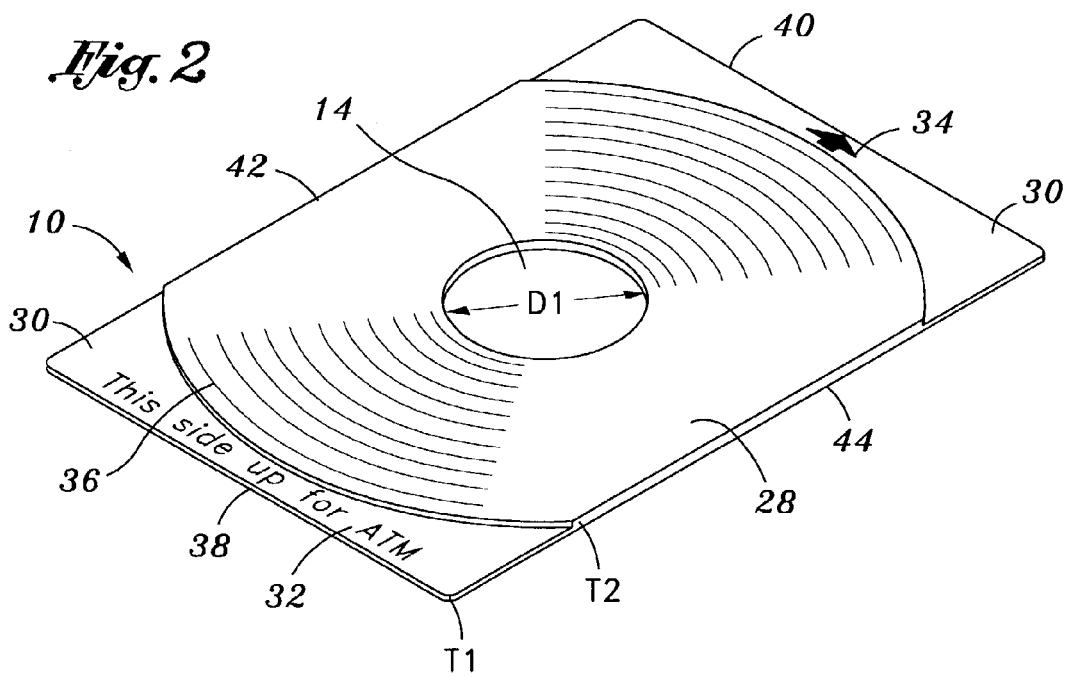

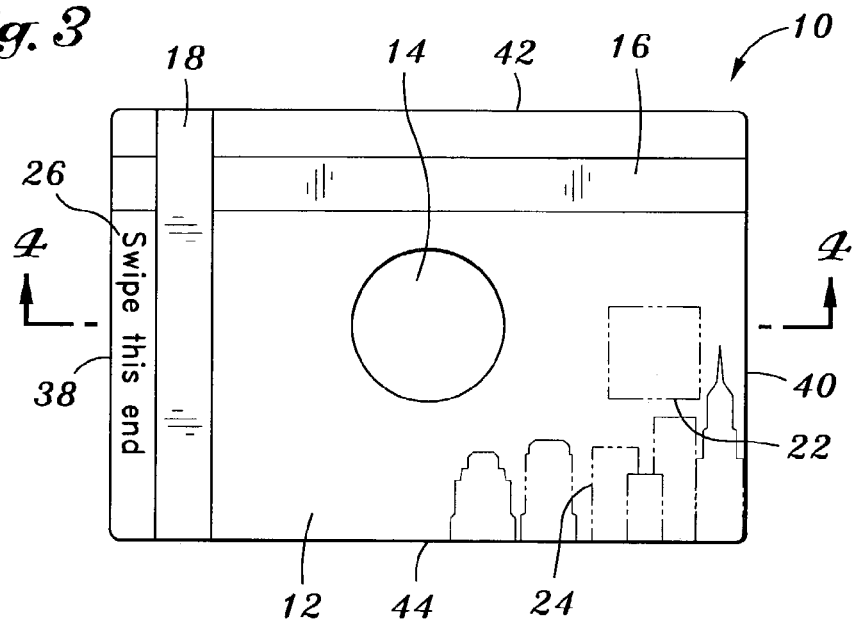
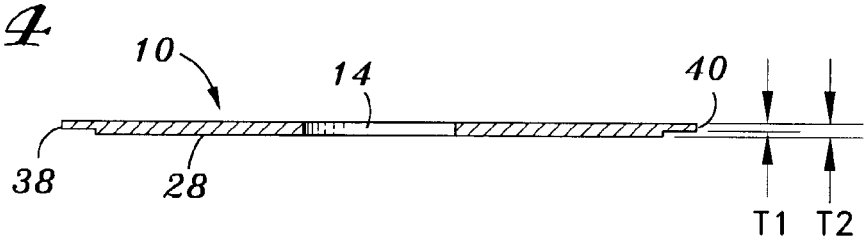
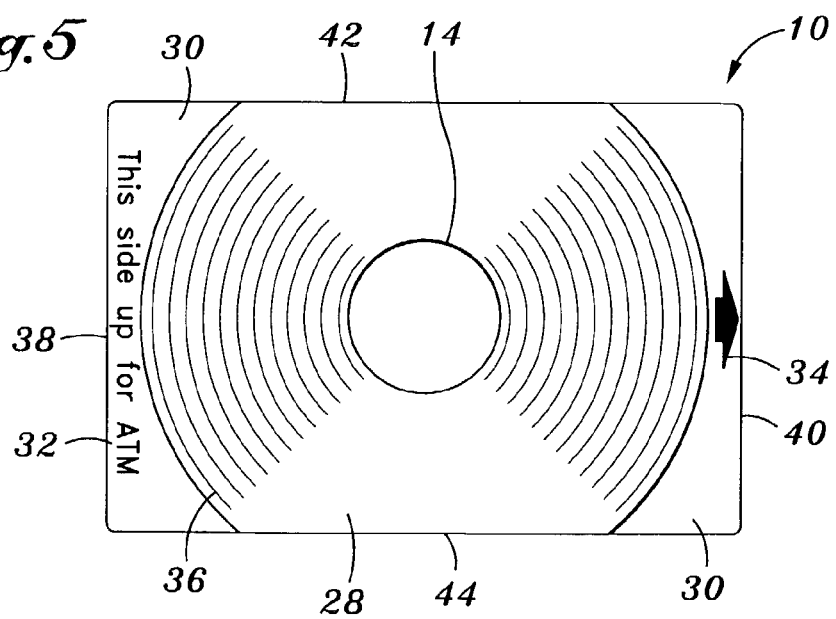

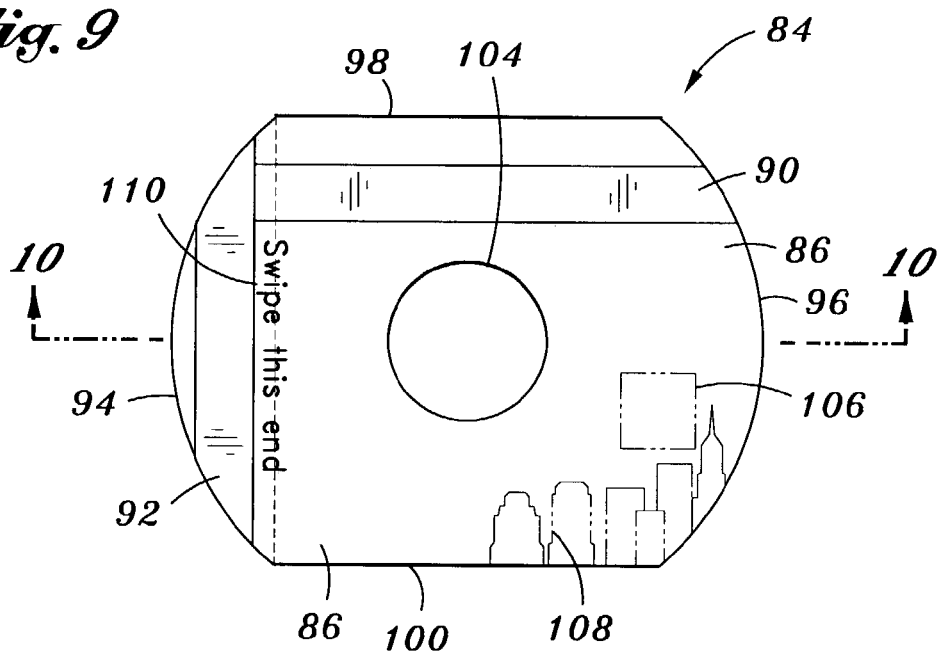
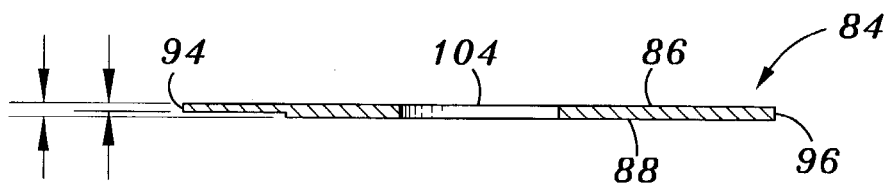
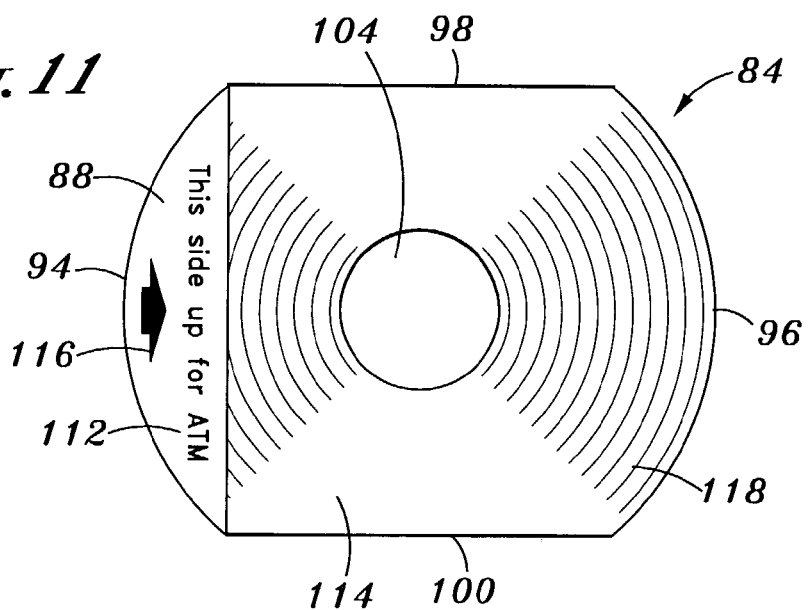

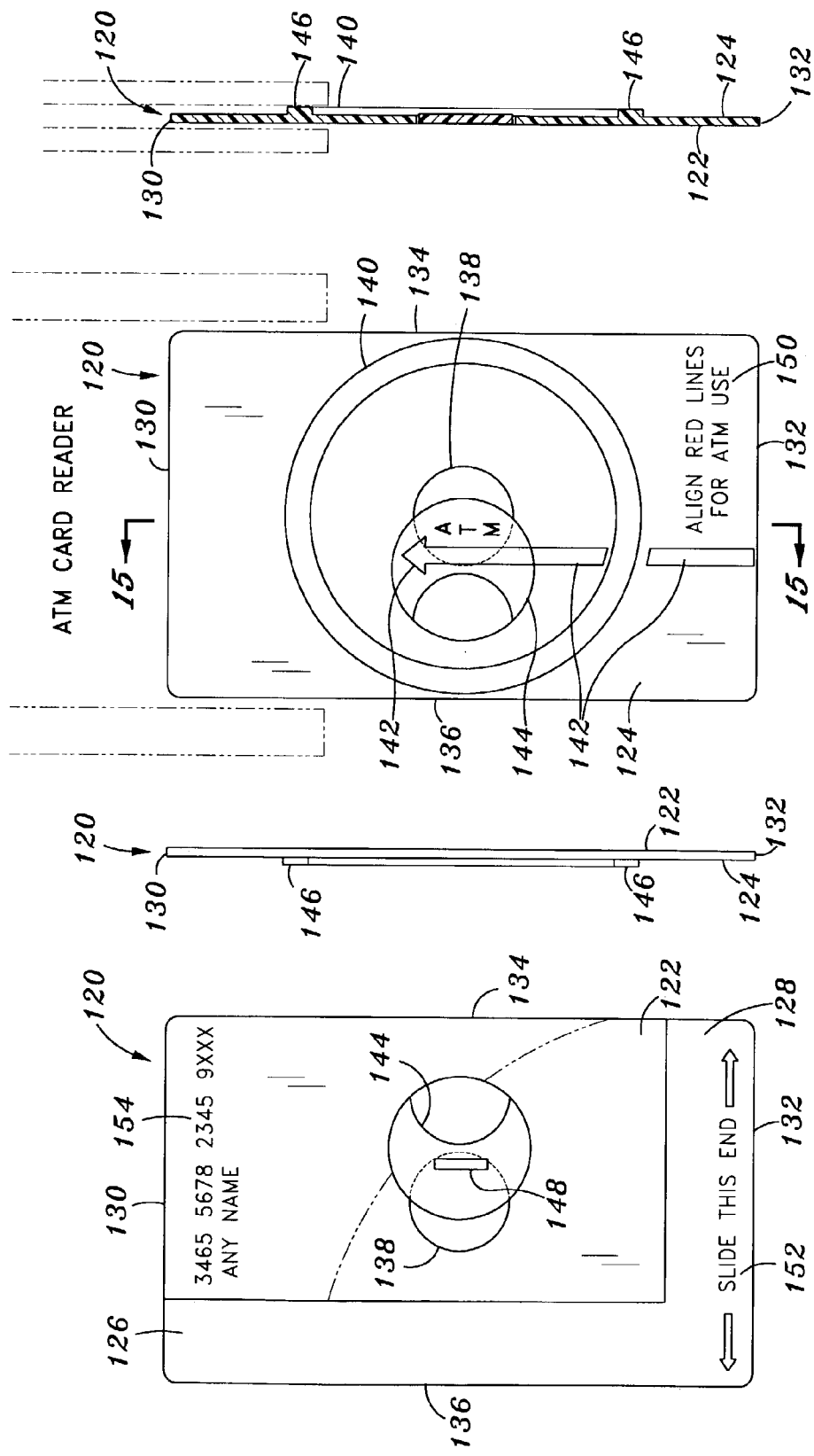

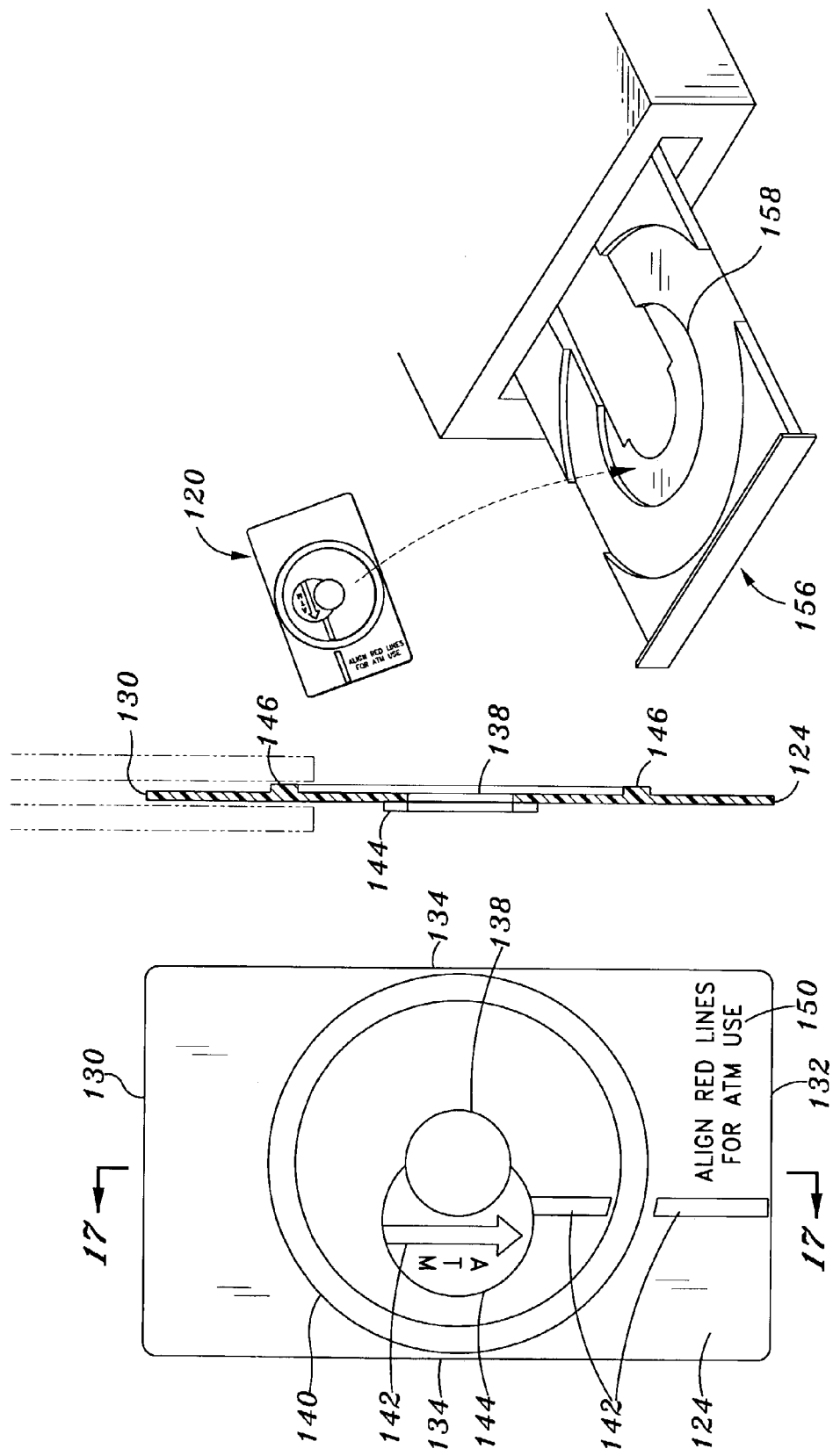

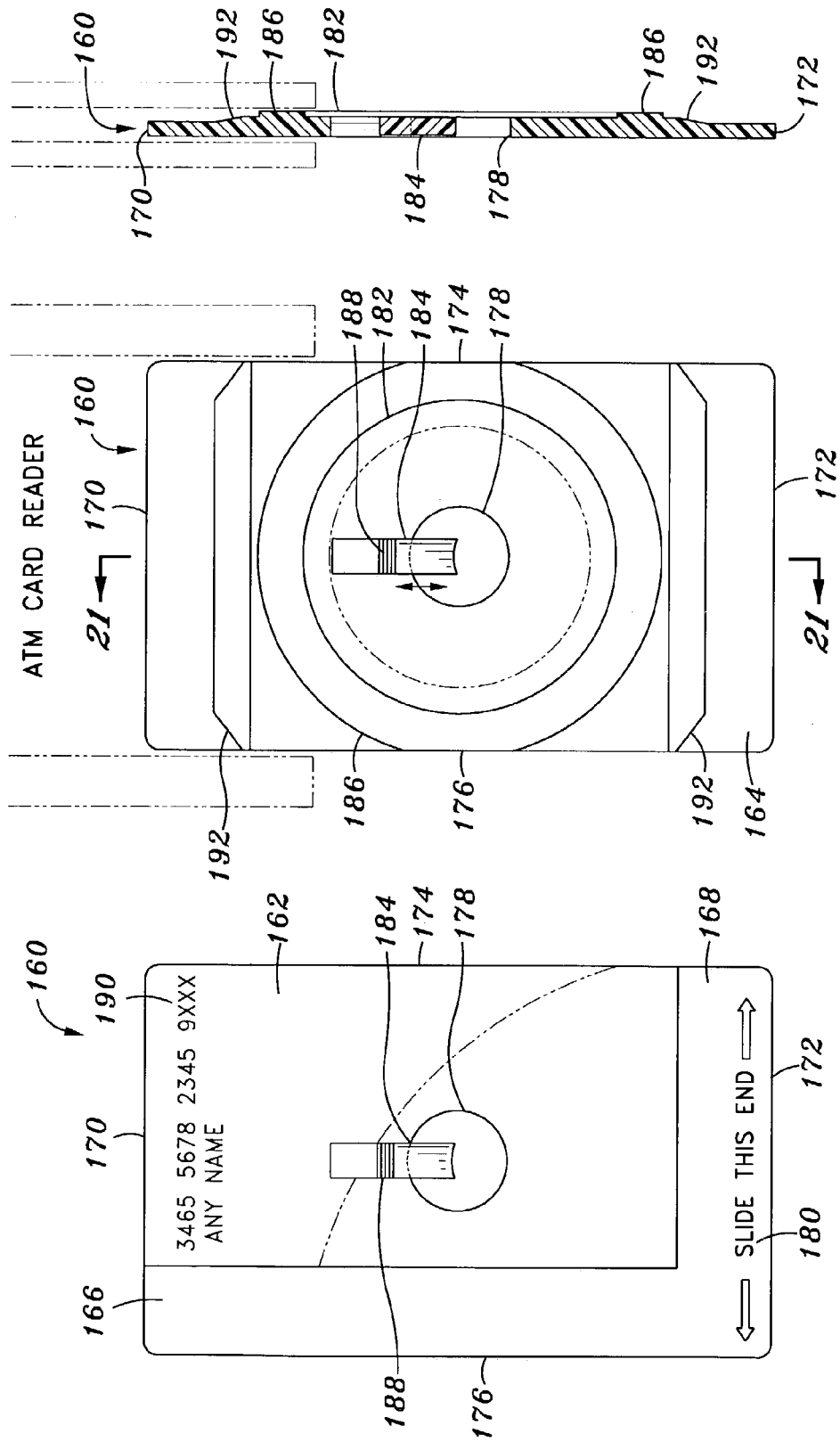

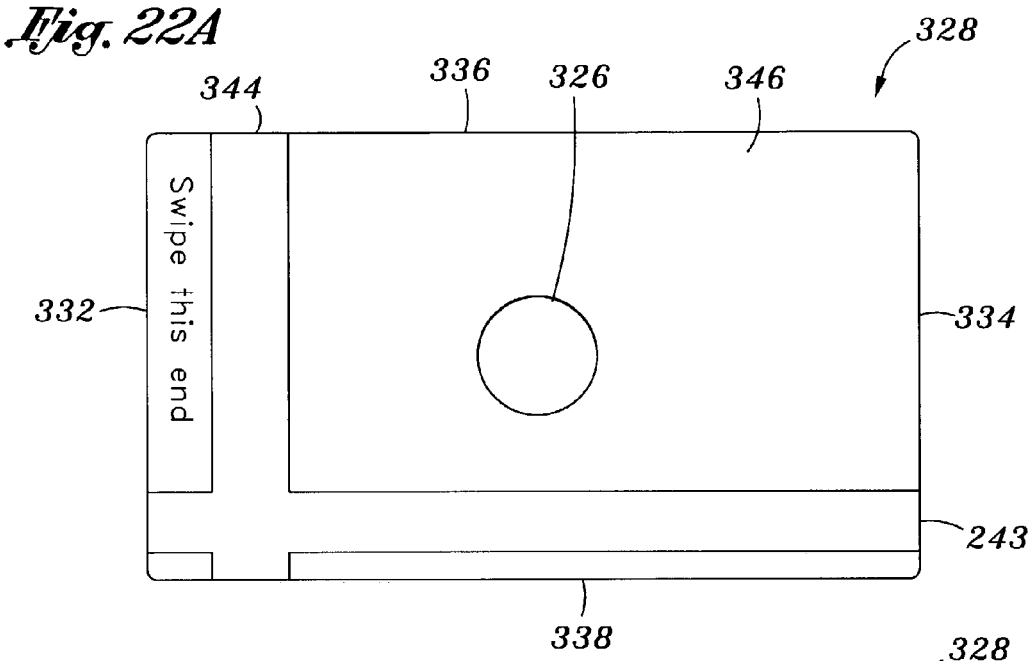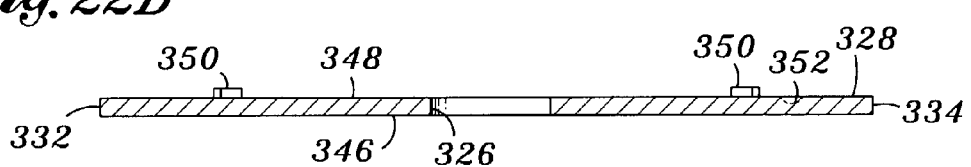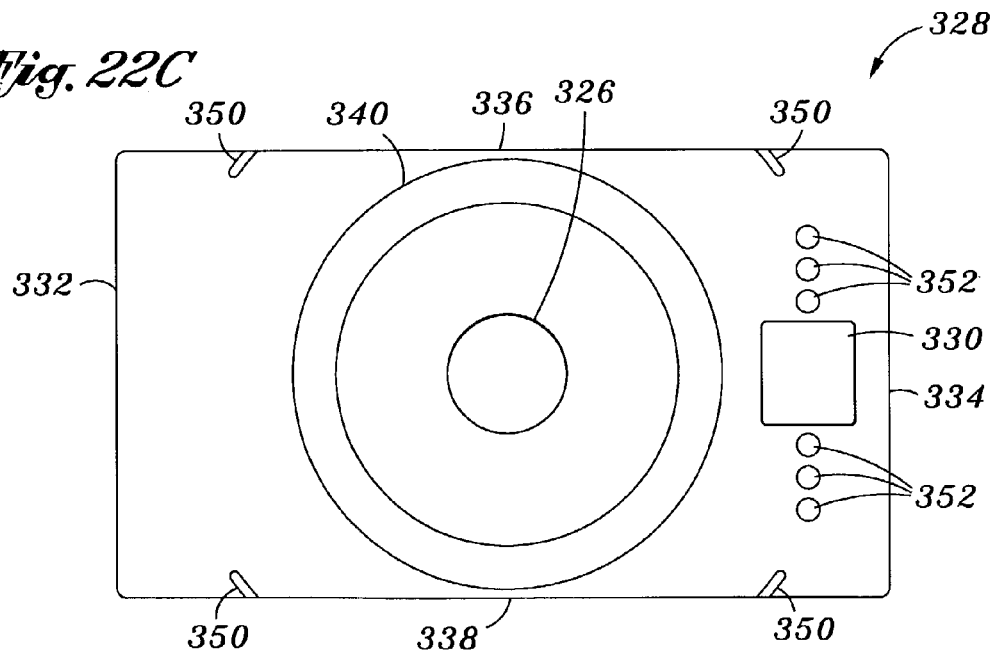

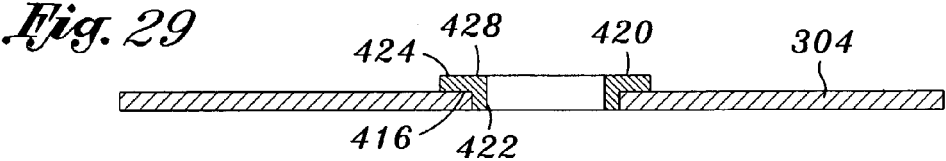
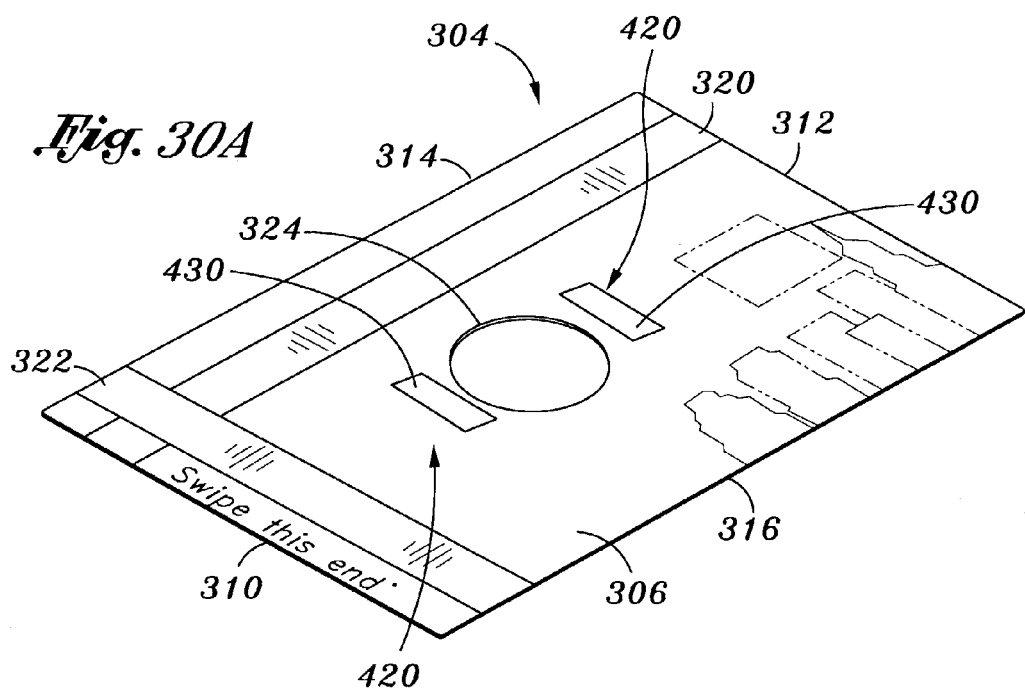
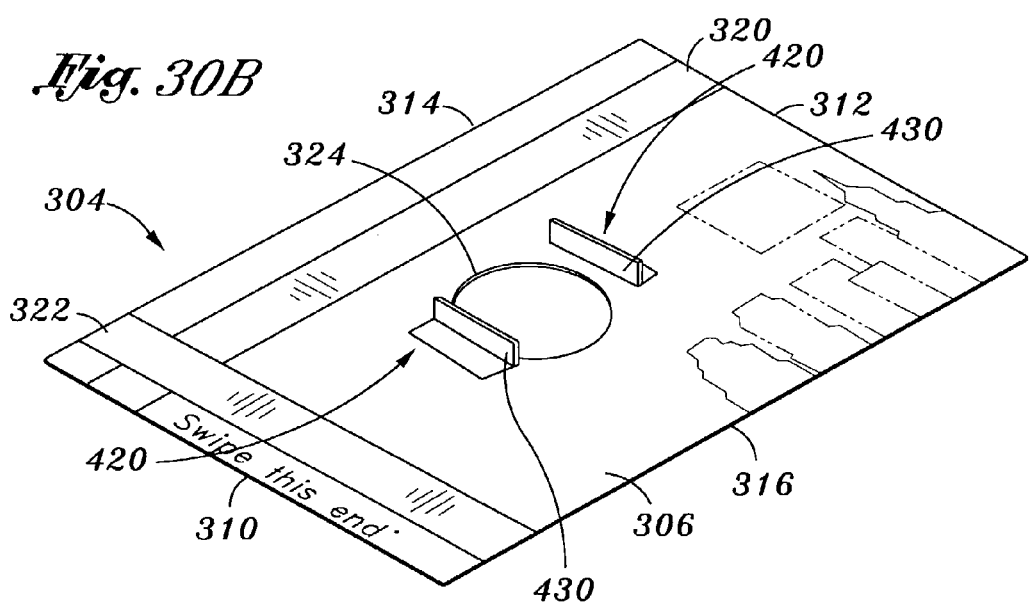

DATA STORAGE CARD HAVING BOTH LINEAR AND ANNULAR DATA REGIONS

CROSS-REFERENCE TO RELATED APPLICATIONS

This application is a continuation-in-part of application Ser. No. 09/655,976, filed Sep. 5, 2000 now U.S. Pat. No. 6,484,940, which is herein incorporated in its entirety.

STATEMENT RE: FEDERALLY SPONSORED RESEARCH/DEVELOPMENT (Not Applicable)

BACKGROUND OF THE INVENTION

The present invention generally relates to the field of portable storage devices for electronic data, and more specifically to card-type devices having both linear magnetic and annular optical data storage regions, such data regions possessing the capability to be written at least once and read several times.

As technological advances have created more powerful and sophisticated electronic equipment at astounding speeds over the years, the size of the software, programs and generated data have grown at proportionally higher rates. Technology that was once 4-bit resolution became 8-bit, which in turn became 16-bit and so forth. As a result, the need for higher capacity data storage has been triggered by such developing technology. For example, at one time, early consumer image scanners were only capable of scanning black and white images, which were typically no more than 300 kilobytes in size (approximately ⅙ the storage capacity of a standard floppy diskette) Today, high resolution consumer color image scanners produce images with millions of colors which are typically as large as 100 megabytes or greater (approximately 50 floppy diskettes). Thus, such advancements in technology demand higher capacity data storage and clearly, such advancements have created a need for a medium capable of supporting such technology.

Ideally, a medium which is portable and easy to carry, highly durable and reliable, generally familiar to the consumer, and has an established base of compatible readers/writers is needed to fill this void. Credit cards have emerged as a standard medium that fits these qualifications. Credit cards are wallet-sized, made of a durable substrate such as plastic, can be embossed with numbers and/or letters, and posses an established market for the use and storage of such cards. Furthermore, consumers are familiar with the way credit cards work and are generally comfortable with using them. Cards in the shape of a credit card are in use by a variety of different companies for the purpose of identifying customers and storing vital information, as demonstrated by the existing use of Automatic Teller Machine ("ATM") cards, driver's licenses membership cards, and other access cards produced for the purpose of identifications.

However, credit cards in their current state have a severe limitation which impedes their ability to be used for more sophisticated purposes. Conventional access cards implementing a magnetic stripe have the capability of storing only a minimal amount of data. Generally, this is sufficient for storing and transmitting simple information such as account numbers and other information which does not require a great deal of data storage space. However, the magnetic stripe alone is insufficient to store large amounts of data. Thus, a higher capacity media used in conjunction with the standardized credit card medium may enhance the capabilities of the current credit cards and similar access cards.

Although several different forms of media with high data storage capacities are available, two have emerged as standards; magnetic data regions and optical data regions. Magnetic data storage involves the electrical encoding of analog or digital information on a magnetic surface. Magnetic data stripes found on credit cards are "swiped" linearly past the detector/encoder element of the read/write device. Magnetic media, as found in floppy diskettes, hard disk drives, and removable disks, is capable of storing larger amounts of data by spinning the storage material around an axis perpendicular to the plane of the surface of the storage material and aligning annular data "tracks" in either concentric parallel nested circular tracks or in a single concentric spiral track.

Optical data regions provide significantly larger storage capacities over magnetic medica of comparable size. Two types of optical regions have been developed: those implemented in an annular fashion and those composed of strips or are generally non-annular in form. Annular optical discs are rapidly spun around a stationary assembly where data is then read through a beam of focused light off of concentric or spiral data tracks embedded in the optical disc. Such discs are typically composed of three types of layers which vary in composition depending on the type of optical disc. One layer is composed of a reflective material which allows an optical lens to reflect the beam of focused light off the optical disc and read the binary data back into the optical readers. A second layer contains the data, which is formed by marks or pits in a permanently encoded form found in mass manufactured audio CDs and computer CD-ROMs, or an organic dye polymer such as cyanine, phthalocyanine or azo as used in CD-Recordable discs. Alternatively, CD-Rewriteable discs utilize a polycrystalline layer that alternates between "amorphous" and "ordered" states to mimic pits and marks. Both the reflective layer and the data layer are embedded between two layers of a supporting structure, typically comprising a plastic, resin, or polycarbonate substrate.

Non-annular optical data regions and optical strips are typically composed of the similar types of material, yet can be less efficient than annular optical data regions. Existing cards which utilize on-annular optical regions or strips have severely limited data transfer rates due to the excessive amount of time that is typically required to read data from the optical strip. To scan an optical strip, either the card or the scanning beam must continuously move back and forth along successive lines of the data track to read the data. This process requires a specialized apparatus specifically designed to read such optical strips, and also requires very high precision in alignment of the card and scanning beams. It is due to this limitation that a number of inventions utilizing such optical strips necessarily disclose a proprietary apparatus for reading and/or writing to the optical strips.

It is intended in this application that any reference to CD, DVD, and/or LD will include not only the listed formats, but also contemplates other optical formats now known or later developed based upon the same technological concepts. Additionally, any reference to a tray-loading, caddy-loading, cartridge-loading, slot-loading, or hub-loading optical drive device is intended to include existing industry-standard optical drive devices as well as any other loading format now known or later developed based upon the same technological concepts.

Ideally, if an optical disc were to conform to either the 5 inch or 3 inch standard currently in use by CD, DVD, and/or LD device drives, the size and shape of the disc allow it to be compatible with most computer systems, stereo systems and other devices which incorporate industry standard optical drives. When CD players and CD-ROM drives were first developed, music and software publishers contemplated the use of two distinct sizes of optical discs: the 5 inch CD and the 3 inch CD ("Mini-CD"). Thus, CD, DVD, and LD drive devices with tray-loading carriage mechanisms came to be manufactured with trays that are compatible with both 5 inch and inch optical discs. Such trays have recessed grooves which allow the 3 inch discs to fit snugly into the tray and ensure that the disc is precisely aligned with the optical beam when the tray is closed. Due to the close spacing between data tracks on an annular optical disc, it is necessary that the disc be precisely aligned with the optical beam. Early optical drives were not manufactured with such specialized grooves and in response to this demand, music and software publishers sometimes included an adapter to convert 3 inch discs into a 5 inch size or sold such adapters separately. By using such an adapter, 3 inch discs could be read by any optical drive which reads 5 inch optical discs.

Similarly, caddy-loading optical drives were developed to provide a more stable environment for the optical disc during spin-up and also incorporated the 3 inch recessed grooves. Further, CD and CD-ROM changer systems utilizing a cartridge-loading mechanism were designed to support such 3 inch discs by incorporating the 3 inch recessed grooves into the cartridges. Thus, 3 inch optical discs are fully supported by the industry and are considered to be an established standard in optical disc size.

A credit card shaped data storage card including an embedded linear magnetic stripe, formed to be compatible with existing 3 inch and/or 5 inch optical drive devices, would allow for a higher capacity of data storage, providing a more sophisticated identification system which could read massive amounts of data from the card to verify the identity of the user and effectuate different transactions. Such identification information may be composed of a genetic fingerprint, retinal scan data, voice signatures, photographic images, digital signatures, encryption algorithms and/or countless other types of information which ensure a more accurate form of identification. Additionally, allowing the data to be stored on the access card itself lifts an enormous burden off the system resources of access card readers, which would otherwise be required to store such large amounts of data internally. For example, if a financial institution were to implement a sophisticated identification system that uses retinal and voice scans in conjunction with a conventional magnetic-stripe access card, literally gigabytes or terabytes of information might need to be stored inside the identification system due to the large size of the graphics and sound files. A high capacity data storage card may allow for a cost effective access card reader which has a lower system resource requirement. Such an access card reader capable of reading a high capacity data storage card may then be distributed in areas of the world where an access card reader may otherwise be too expensive to maintain, such as third world countries. Further, a financial institution could store a consumer's complete account history with a self contained program which executes on the customer's home or laptop computer.

To implement the promise of such an access card, a way must be found to make them compatible with contemporary computers, ATM machines, magnetic stripe readers, and optical drives to allow everyday use by lay consumers. Contemporary systems using an optical strip generally require the use of a specialized read/write apparatus. Some prior art devices combine both linear magnetic stripes with optical strips while others combine linear magnetic stripes with annular optical regions. Although adding an optical region or optical strip is advantageous due to the increased data capacity, the read/write apparatus may be costly and difficult to integrate into a current marketplace that may be less responsive to integrating a new technology. Existing card readers might need to be updated with a specialized apparatus, causing a higher expenditure for those who wish to integrate the card and a burden on consumers who are unfamiliar with the technology. Additionally, the optical region integrated into contemporary devices is typically configured to be a read-only data region, utilizing prerecorded data. A read-only data region may provide a secure form of transferring data such that the data written to the card will be unalterable by any means. However, the use of an annular optical data region would provide the benefit of selecting from a variety of materials for the data layer such as an organic dye polymer used in CD-Recordables, polycrystalline used in CD-Rewriteables, or a permanent read-only form. CD-writers are readily available in the marketplace and generally inexpensive. Such CD-writers could potentially be used for the purpose of reading and writing data to annular optical data regions whereas optical strips may not be compatible with conventional CD-writers, and may require a specialized apparatus or manufacturing process to read and write data.

Integrating both a magnetic stripe and an annular optical data region presents the additional problem of providing a card body sufficiently thin enough to pass through a magnetic stripe reader. Conventional credit cards are formed with a thickness of approximately 0.76 mm while conventional annular optical discs may be formed with a thickness of approximately 1.20 mm. Combining both an annular optical data region and a magnetic stripe in a single card requires that the card be engagable with both an optical drive carriage and magnetic stripe reader depending on the thickness allowed by the magnetic stripe reader. Magnetic stripe "swipe" type readers may allow a card having a thickness of approximately 0.96 mm. Due to this thickness limitation, a conventional optical disc may be too thick to pass through magnetic stripe reader. Consequently, a card having both an annular optical data region and a magnetic stripe may be too thick to pass through a magnetic stripe reader if configured with a thickness of 1.20 mm.

A data storage card formed with both an optical annular region and a magnetic data region may also provide a data storage medium for online transactions. Due to the explosive growth of the Internet and online transactions, payments are typically made online via the time consuming process of manually entering customer information and credit card numbers for purchases. Although retailers accept payment via credit cards using magnetic stripe readers, online retailers are continually searching for a way to expedite online transactions by making the payment process as easy as possible. Lay consumers may find a product of interest on the Internet but may be dissuaded from making an online purchase due to the difficulty of inputting account information for fear that such a transaction may require extensive computer knowledge to complete. Thus, several online purchases may be initiated by customers intending to make a purchase but do not ever complete the process, thereby causing the online retailer to lose potential business. In addition, lay consumers may be skeptical of gaining the trust of the Internet and be generally unwilling to input credit card numbers manually into a computer for transmission over the Internet. This fear may be reinforced by the view that hackers are lurking on the Internet waiting to intercept such transactions. Although encryption technology may be as strong as a 128-bit level, encryption technology is continually developing to provide a safer means of transmitting data over potentially unsecured communications lines such as the Internet. A data storage card having an annular optical data region and a magnetic stripe formed to be compatible with a consumer's computer may further allow a consumer to confidently make online purchases. Such a card may be formed to allow a consumer to confidently make online purchases. Such a card may be formed to allow a consumer to insert the card into their personal computer with the need to manually input account information. In this respect, a consumer may present the card at a retailer's magnetic stripe reader for making purchases and may additionally make online purchases from home by inserting the card into a personal computer. Additionally, providing a high data capacity may allow for the card to incorporate a more sophisticated encryption algorithm. Using such security means over the Internet may further alleviate the fears of consumers. Thus, both the difficulty of making an online purchase and a fear of safely transmitting account information may dissuade a potential customer from making an online purchase. It is clear that an ideal data storage card is needed which has the capacity to store large amounts of data, has the ability to accommodate future technologies which may expand the data storage space, is compatible with existing read/write devices, is portable and easy to carry, is highly durable and reliable, is generally familiar to the consumer, provides security features, and most importantly allow seamless and expedient integration into the marketplace.

Contemporary devices have a shape and size roughly the same as a credit card. However, there is generally minimal attention dedicated to compatibility issues which may arise if the card was specifically used in ATM machines or other existing devices. There are tens of thousands of ATM machines in use today and there are several different mechanisms in use which allow the ATM cards to be read. Among the varieties of ATM card mechanisms are those which incorporate a stationary magnetic stripe "swiper," while others require the ATM card to be physically inserted into the drive mechanism/roller drive mechanism. A commonly used ATM tractor drive pulls the card onto a series of rollers arrayed along the center of the card. Current ATM cards are properly adapted to operate in such ATM machines. However, a card having an obstacle, void or physical restraint in the center of the card may become stuck by one of the rollers. This may cause a card to become trapped in and disable feed mechanisms of ATM machines currently in use.

Accordingly, there is a need for a data storage card that incorporates both a magnetic strip and an annular optical region, which is compatible with currently existing optical device drives and magnetic strip readers in widespread use. The present invention addresses the above-described deficiencies of a conventional credit cards, providing an access card having high capacity data storage in a credit-card-shaped medium which may be read/written by industry standard optical drives and ATM machines.

BRIEF SUMMARY OF THE INVENTION

In accordance with the present invention, there is provided a data storage card having optical and magnetic data storage regions. The card is formed to cooperatively engage both a drive mechanism of a magnetic stripe reader and a drive mechanism of an optical data reader. The card includes a card body with a first and second opposed generally planar surfaces. The card also includes at least one annular optical data storage region disposed on one or both of the first and second surfaces of the card body. Moreover, the card includes at least one magnetic linear data storage region disposed on one or both of the first and second surfaces. Additionally, the card includes an optical carriage engaging aperture formed in the card body, and the aperture is used to engage a drive mechanism of an optical data reader. The card also includes a covering member that is attached to one or both of the first and second surfaces so as to extend over and within the aperture. The covering member is resiliently displaceable out of the aperture to allow engagement of the aperture to a drive mechanism of an optical data reader. Advantageously, the covering member provides a contact surface over the aperture for rollers in a magnetic data reader to grip the card, thereby reducing the chance of the card getting stuck therein. Also, the covering member resiliently displaces when used in an optical data reader, and displacement of the covering member is automatic for convenience.

In one embodiment, the covering member includes a plug and a seal. The seal is attached to one or both of the first and second surfaces. Also, the seal is connected to the plug, and the plug is positioned within the aperture when the covering member is in a first position, but the plug is disposed substantially outside the aperture when the covering member is in a second position. In one specific embodiment, when the covering member is in the second position, the plug is completely outside the aperture.

In another aspect, the data storage card includes an optical data storage region that is formed as an optically readable film applied to the card body. In one embodiment, the film is scratch resistant, at least partially blocks ultraviolet light, has a high tensile strength, and resiliently bends without compromising the integrity of the optical data. Because the optical data storage region is formed as a film, the overall thickness of the card is advantageously reduced, thereby allowing the card to be used in standard magnetic data readers.

In yet another aspect, the data storage card also includes a semiconductor memory chip embedded in the card body, and the card includes at least one counterbalance weight disposed on the card body. In one embodiment, the counterbalance weight is a non-integrally attached member made out of a material that is different from the card body. In another embodiment, the counterbalance weight is formed by a counterbalanced distribution of material that makes up the card body. The counterbalance weight is configured so as to balance the data storage card when rotated such that the spinning card remains stable and the optical data can be properly read.

In still another aspect, the data storage card further includes a spacer attached to one or both of the first and second surfaces. The spacer has an extendible member that selectively projects outward from the respective surface(s). The extendible member engages with an abutment member of an optical data reader. The spacer allows a thinner card to be used in a standard optical data reader.

In one other aspect of the present invention, the optical carriage engaging aperture has a diameter less than 11.1 mm. As such, the diameter of the aperture is significantly smaller than the diameter of standard optical data discs. Thus, when the data storage card is placed upon a spindle inside an optical data reader, the card rests axially higher on the spindle, thereby allowing abutment members to contact the data storage card as they normally would any other optical data discs.

In another aspect of the present invention, the optical carriage engaging aperture is off-center in the lateral, as opposed to longitudinal direction. As such, rollers typically used to feed the card in and out of a magnetic data reader are more likely to contact the card as it feeds in and out, and is unlikely to be stuck in the process.

Additional modifications and improvements of the present invention may also be apparent to those of ordinary skill in the art. Thus, the particular combination of parts described and illustrated herein is not intended to serve as limitations of alternative devices within the spirit and scope of the invention.

BRIEF DESCRIPTION OF THE DRAWINGS

These as well as other features of the present invention will become more apparent upon reference to the drawings wherein:

FIG. 1 is a top-side perspective view showing the first planar surface of a second embodiment of the data storage card made according to the present invention;

FIG. 2 is a bottom-side perspective view showing the second planar surface of a second embodiment of the data storage card made according to the present invention;

FIG. 3 is a top view of showing the first planar surface of a second embodiment of the data storage card made according to the present invention;

FIG. 4 is a cross-sectional view of a second embodiment of the data storage card made according to the present invention;

FIG. 5 is a bottom view showing the second planar surface of a second embodiment of the data storage card made according to the present invention;

FIG. 9 is a top view showing the first planar surface of a fourth embodiment of the data storage card made according to the present invention;

FIG. 10 is a cross-sectional view of a fourth embodiment of the data storage card made according to the present invention;

FIG. 11 is a bottom view showing the second planar surface of a fourth embodiment of the data storage card made according to the present invention;

FIG. 12 is a top view showing the first planar surface of a fifth embodiment of the data storage card made according to the present invention;

FIG. 13 is a cross-sectional view of a fifth embodiment of the data storage card made according to the present invention;

FIG. 14 depicts a bottom view of a fifth embodiment of the data storage card made according to the present invention cooperatively engaging with a magnetic stripe reader;

FIG. 15 depicts a cross-sectional view of a fifth embodiment of the data storage card made according to the present invention cooperatively engaging with a magnetic stripe reader;

FIG. 16 is a bottom view showing the second planar surface of a firth embodiment of the data storage card made according to the present invention;

FIG. 17 depicts a cross-sectional view of a fifth embodiment of the data storage card made according to the present invention cooperatively engaging with a magnetic stripe reader;

FIG. 18 depicts a fifth embodiment of the data storage card made according to the present invention cooperatively engaging with an optical drive carriage;

FIG. 19 is a top view of a sixth embodiment of the data storage card made according to the present invention;

FIG. 20 is a bottom view of a sixth embodiment of the data storage card made according to the present invention cooperatively engaging with a magnetic stripe reader;

FIG. 21 is a cross-sectional view of a sixth embodiment of the data storage card made according to the present invention cooperatively engaging with a magnetic stripe reader;

FIG. 22A is a top view of an eighth embodiment of the data storage card made according to the present invention;

FIG. 22B is a cross-sectional view of an eighth embodiment of the data storage card made according to the present invention;

FIG. 22C is a bottom view of an eighth embodiment of the data storage card made according to the present invention;

FIG. 29 is a cross sectional view of a data storage card with a spacer attached thereto;

FIG. 30A is a top perspective view of a data storage card with an alternative embodiment of a spacer attached thereto, the spacer shown in a closed configuration;

FIG. 30B is a top perspective view of the data storage card of FIG. 30A with the spacer shown in an open configuration;

DETAILED DESCRIPTION OF THE PREFERRED EMBODIMENT

The detailed description, as set forth below in connection with the appended drawings, is intended as a description of the presently preferred embodiments of the invention, and is not intended to represent the only form in which the present invention may be constructed or utilized.

Figure 1A:
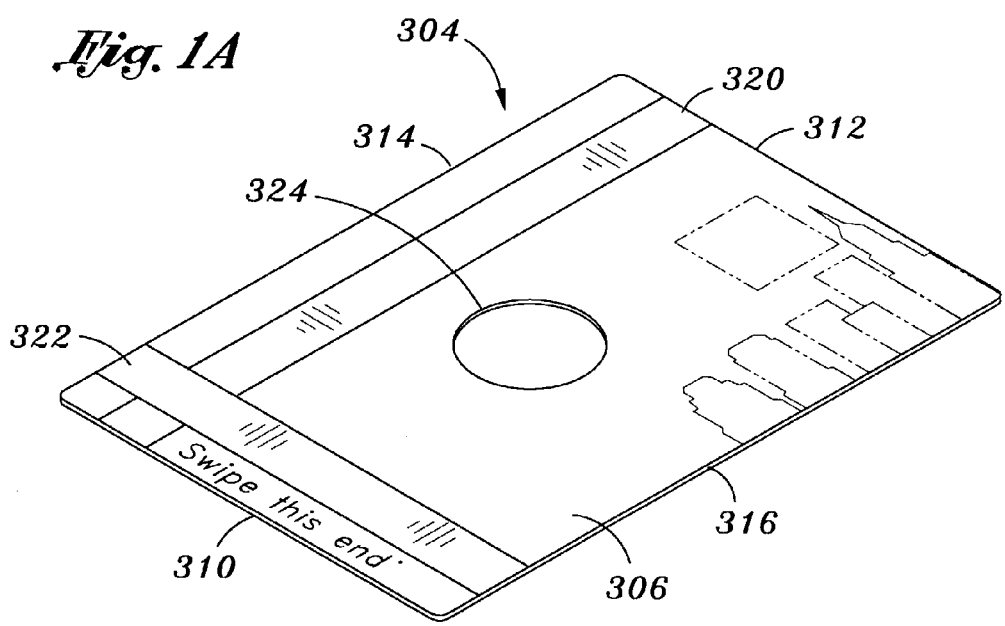
FIG. 1A is a top-side perspective view showing the first planar surface of a first embodiment of the data storage card made according to the present invention.
Figure 1B:
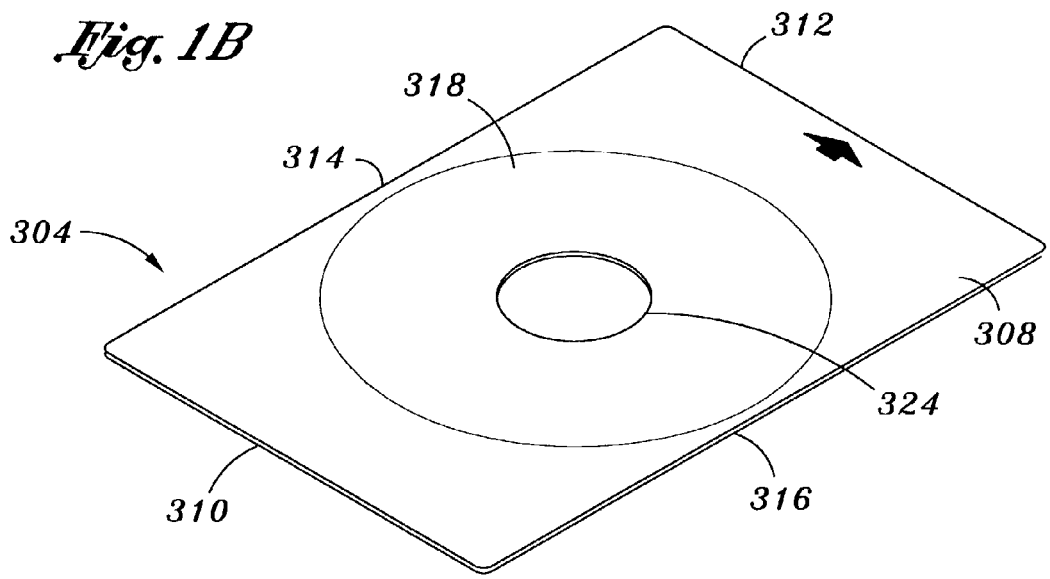
FIG. 1B is a bottom-side perspective view showing the second planar surface of a first embodiment of the data storage card made according to the present invention.

Referring now to the drawings wherein the showings are for purposes of illustrating preferred embodiments of the present invention only, and not for purposes of limiting the same, FIGS. 1A & 1B a first embodiment of the data storage card made according to the present invention. The card may include a substantially planar card body 304 defining a first planar surface 306 and defining a second planar surface 308. In this respect, the card body 304 may be substantially flush throughout the planar surfaces 306 and 308. The card may further include a card body 304 having both optical and magnetic data storage regions and formed to cooperatively engage both a drive mechanism of a magnetic stripe reader and a drive mechanism of an optical data reader. Further a first embodiment of the present invention may also include first and second longitudinal edges 310 and 312 disposed in spaced opposed relation along the perimeter of the card body 304. The card may also include first and second lateral edges 314 and 316 disposed in spaced opposed relation along the perimeter of the card body perpendicular to the first and second longitudinal edges 310 and 312. At least one annular optical data region 318 may be disposed on at least one for the first and second surfaces 306 and 308. At least one magnetic linear data region 320 and a second magnetic linear data region 322 may be disposed on at least one of the first and second surfaces 306 and 308. An optical carriage engaging aperture 324 may be formed in the center of the card body 304. Advantageously, a substantially flush profile of the card body 304 having a thickness of approximately 0.76 mm may allow the card to be used with conventional magnetic stripe readers. In another embodiment the card body has a thickness of approximately 0.90 mm. Since conventional credit cards are approximately 0.76 mm thick, a card having the same thickness maybe used with the same magnetic stripe readers currently capable of reading credit cards up to approximately 0.96 mm. Accordingly, the card body 304 may have a thickness of up to 0.96 mm with the optical data region 318 adding an additional thickness to the card body 304. However, the first embodiment of the present invention may advantageously be formed substantially flush throughout the card body 304, which may be formed as a conventional optical disk having an integral substrate. In one embodiment, reflective and optical data layers are co-extensive with the card body. In another embodiment reflective and optical data layers are confined to a portion of the card body.

Referring now to FIGS. 1–5, the drawings illustrate a second embodiment of the data storage card made according to the present invention, which has a card body 10 that is a size and shape similar to conventional credit cards. To better illustrate the features of the data storage card, parts of the drawings may be exaggerated to emphasize the various physical differences. FIG. 1 shows a top-side perspective view, FIG. 2 is a bottom-side perspective view, FIG. 3 shows a top planar view, FIG. 4 shows a cross-sectional view, and FIG. 5 shows a bottom planar view of a third embodiment of the data storage card. The card body 10 comprises a first longitudinal edge 38 and a second longitudinal edge 40. The measurement from first longitudinal edge 8 to second longitudinal edge 40 is preferably 85.6 mm, but may be any measurement as long as the functionality of the magnetic and optical data regions are not affected such that data may be written to and read from the magnetic and optical data regions.

Referring now to FIGS. 1, 2, 3, and 5, the card body 10 comprises a first lateral edge 42 and a second lateral edge 44. The measurement from first lateral edge 42 to second lateral edge 44 is preferably 53.98 mm, but may also be of any measurement as long as the functionality of the magnetic and optical data regions are not affected. The approximately rectangular shape of the card body 10 allows the data storage card to be carried in standard wallets and other accessories that are shaped to fit credit cards. The corners of the card body 10 are preferably rounded to conform to the general shape of a credit card and to prevent a sharp point from injuring a user.

Referring now to FIGS. 1 and 3, the first planar surface 12 can be made of any substrate, preferably polycarbonate, resin, plastic, or another comparable material, that is durable and flexible to prevent the card body 10 from cracking or breaking from excessive pressure in a wallet and to generally protect against "wear and tear." The substrate material should also allow the first planar surface 12 to be silk screened such that a company logo, design, or other desirable artwork may be silk screened such that a company logo, design, or other desirable artwork may be silk screened onto the first planar surface 12 in a designated artwork area 24. Due to the inherent reflective properties of the optical data region, a holographic image may be integrated into the card body 10, providing another security feature. Furthermore, a holographic sticker may be silk screened onto the first planar surface 12, similar to the holographic images financial institutions currently use to ensure authenticity of the data storage card. In addition, a bar code may be placed on the first planar surface 12 to allow for standard bar code scanners to identify cardholders or to provide an extra level of security. A holographic image, or another form of unique security device that proves authenticity, may be embedded or silk screened onto the first planar surface 12 in a holographic receiving area 22. In other words, any usable area of the first planar surface 12 not occupied by a data region or inscription may be used for designs or other similar silk screened material.

Referring now to FIGS. 1–5, an optical carriage engaging aperture/central hub assembly 14 having a diameter D1 formed therein and shaped to engage the drive mechanism/rotatable spindle of an optical data reader, may be punched in the center of the card body 10 to allow the card body 10 to be cooperatively engaged with an optical drive's rotatable spindle (not shown). The optical carriage engaging aperture 14 is incorporated into the card body 10 to ensure compatibility with contemporary optical drives designed for CDs, DVDs, LDs, or any other optical drive incorporated a 5 inch and/or 3 inch disc size. The diameter D1 of the optical carriage engaging aperture 14 should measure approximately 9/16" but in all embodiments, the diameter D1 of the optical carriage engaging aperture 14 shall be of a size that allows the card body 10 to be properly mounted in an industry standard optical drive. When the card body 10 is used with a tray-loading, slot-loading, or cartridge-loading carriage, the optical drive's arm positions itself over the optical carriage engaging aperture 14 through the first planar surface 12 or second planar surface 30. A rotatable spindle that is fit to the specifications of the rotatable spindle engaging hub mounts the card's optical carriage engaging aperture 14 and may spin the card body 10 at a constant linear velocity around the card's perpendicular axis. A hub-loading optical drive utilizes a rotatable spindle with a plurality of ball bearings or other notches attached to the rotatable spindle to keep optical discs in place during rotation (not shown). A user mounts the card body 10 onto the rotatable spindle by cooperatively engaging the optical carriage engaging aperture 14 of the card body 10 with the ball bearings or notches on the rotatable spindle such that the card body 10 is "snapped" snugly into place. The hub-loading optical drive then spins the card body 10 at a constant linear velocity around the card body's 10 perpendicular axis. The speed of the rotation may be varied depending upon the optical drive's configuration. For example, some optical drives spin the optical discs at a constant linear velocity while other incorporate a "max" technology known in the art, which may increase the rotation speed as the drive reads the outer edges of the optical disc. It is anticipated that the present invention may incorporate other means for mounting optical discs which allow optical discs to rotate faster for increased transfer rates. Furthermore, since annular optical data regions are read from the innermost area to the outermost area, a decrease in the size of the optical carriage engaging aperture 14 may provide for enhanced date capacity.

Referring now to FIGS. 1 and 3, a first linear magnetic data region 16 extending from first longitudinal edge 38 to second longitudinal edge 40 should be disposed on the first planar surface 12 of the card body 10. The linear magnetic stripe devices such as ATM's and point-of-sale credit card readers. A second linear magnetic data region 18 is disposed perpendicular to the first linear magnetic data region 16, extending from first lateral edge 42 to second lateral edge 44 on the first planar surface 12 of the card body 10. The thickness of both the first linear magnetic data region 16 and the second linear magnetic data region 18 are preferably 8 mm thick but may vary so long as the thickness is sufficient to allow compatibility with existing magnetic stripe readers.

Referring now to FIGS. 2 and 5, the data storage card may be formed as a multi-function card which may be used in several different types of machines. The manner in which the card body 10 is inserted, swiped or otherwise cooperatively engaged with a reading or writing device depends on the application for which it is to be used. For example, to use the data storage card in an ATM machine, the card body 10 must be inserted with the card body's 10 magnetic stripe facing the proper direction into the machine's slot. A directional indicator 40 may be incorporated to inform the user of the proper manner in which the data storage card should be inserted into ATM machines. However, the exact position of the directional indicator 34 is not critical and may be placed elsewhere. To further instruct the user as to which planar surface should be facing up when inserting the data storage card into an ATM machine, a first inscription 32 may be printed or embossed on an area of the second planar surface 30. For example, an inscription stating "This Side Up for ATM" is preferred as an instructional statement to the user. Some ATM machines may require that the card be inserted or swiped such that the card is held perpendicular to a horizontal plane. In such cases, a pictorial representation would be more appropriate in instructing a user how to insert the card body 10. The exact content and placement of the first inscription 32 may vary as long as the first inscription 32 assists the user in properly inserting the card body 10 into an ATM machine.

Referring now to FIGS. 1 and 3, the thickness of the card body 10 at the first longitudinal edge 38 should be of a minimal thickness T1, measuring approximately 0.76 mm. The thickness T2 of the card body 10 may be thicker where the optical region 28 is disposed, measuring approximately 0.90 mm. The additional thickness T2 of the card body 10 may prevent the card body 10 from passing through some of the existing magnetic stripe readers. Some magnetic stripe readers require a card's thickness to be equal to T1 or less than T2. Other magnetic stripe readers may require that the card be no thicker than 0.96 mm. To be compatible with such magnetic stripe readers, the card body 10 may be alternatively "swiped" along one of the first and second longitudinal edges 38 and 40 closest to where the second linear magnetic data region 18 is disposed in a reduced thickness portion of the card body 10. In some situations, the second linear magnetic data region 18 may contain exactly the same data as the first linear magnetic data region 16. However, it is possible to program the second linear magnetic data region 18 to contain a wholly different set of data than the first linear magnetic data region 16. For example, the first linear magnetic date region 18 may contain an account number while the second linear magnetic data region 20 may contain a digital encryption key which verifies the user. A second inscription 26 may be disposed on the first planar surface 12 between the second linear magnetic data region 18 and the first longitudinal edge 38. This second inscription 36 may be used to instruct the user of which linear magnetic data region is to be used with their corresponding application. For example, "Swipe This End" may be used to indicate that the second linear magnetic data region 18 is to be used for "swiping" through magnetic stripe card readers. However, additional inscriptions may be used or disposed on other areas of the first planar surface 12 to indicate the use of each linear magnetic data region 16 and 18. Alternatively, it is anticipated that the thickness T2 of the card body 10 may be less than 0.96 mm as discussed above.

Referring now to FIGS. 4 and 5, an annular optical data region 28 is preferably disposed on the second planar surface 30. A cross-sectional profile of the card body 10 taken along one of the first and second lateral edges 42 and 44 depicts the truncated conical raised portion of the card body 10. Contemporary optical drive carriages are constructed with a circular recessed groove made to fit 3 inch optical discs (not shown). Thus, a portion of the second planar surface 30 should be constructed with at least one physical step which allows the card body 10 to fit snugly into the recessed groove of an optical drive's carriage. In the second embodiment, the entire optical annular data region 28 is raised to complement the optical drive carriage's recessed groove. Precise alignment of the disc with the recessed grooves ensures that the optical drive properly mounts to the disc to read the optical track 36.

Referring now to FIGS. 2 and 5, the annular optical data region 28 disposed on the second planar surface 30 having at least one data track 36, should preferably be manufactured with a configuration which allows the data substrate to be varied. The composition of the material embedded within the annular optical data region 28 can drastically change the possible applications available. If cyanine, phthalocyanine, azo, or another comparable ink is used for the annular optical data region 28, the card has the capability of being programmed by a computer system with a compact disc recorder drive ("CD Burner"). If the card body 10 is manufactured with a polycrystalline layer for the annular optical data region 28, the card body 10 may be written and rewritten by a CD Burner with the capability of writing and erasing standard CD-Rewriteable discs. In this form, the card body 10 may be used as a storage device that can be written and rewritten to several times, limited only by the polycrystalline's lifetime. In addition, businesses can be easily equipped to read and write the card by implementing a readily available CD Burner into their business computers.

Additionally, the format and configuration of the data tracks 36 may increase the capacity of the annular optical data region. For example, the annular optical data region 28 may be manufactured in a DVD compatible format such that the data capacity of the card may be significantly increased. Or, incorporating a DIVX compatible format would allow the card to have a significantly increased storage capacity and would add the feature of creating a predetermined expiration date or number of uses for the card. The maximum data capacity of the annular optical data region 28, will depend on the amount of surface area that is available after the first and second magnetic data stripes 16 and 18 have been incorporated. However, the outer edges of the annular optical data region 28k may take any shape as long as the card body 10 is always compatible with the 3 inch grooves found in optical drive carriages. Therefore, the shape and data capacity of the annular optical data region 28 may be varied according to the intended application of the card.

Referring now to FIGS. 2 and 5, an advantage of incorporating the annular optical data region 30 is that it may be possible to take advantage of the several different software security protection schemes for CD-ROM and DVD-ROM discs which ensure that no duplicates are made. For example, some of these protection methods embed hidden errors in the data structure which are unreadable for the purposes of duplicating, but are read by the software as a means of verifying the authenticity of the data contents. Such sophisticated protection schemes may be integrated into the card through use of specialized programming techniques; Those who wish to produce a highly secure card will then have the benefit of using existing hardware and software security technology and future developments that are compatible with optical discs being developed.

Referring now to FIGS. 1 and 3, a protective coating may be applied to the annular optical data region 28 to guard the disc against environmentally hazardous conditions that may affect the data integrity of the optical tracks 36. The coating may be applied for the purpose of protecting the annular optical data region 28 against excessive exposure of sunlight, scratches, heat, liquids, and other substances which may harm the integrity of the optical data tracks 36. In one embodiment, a polysiloxane coating, such as SOL-GEL from SEG, is used to protect the optical tracks 136 in this way. In another embodiment, the coating is applied to the entire card to thereby protect both the optical data region 28 and the magnetic data region Also, in another embodiment, the substrate of the optical data region 318 is scratch resistant, blocks ultraviolet light, is flexible so as to maintain the integrity of the optical data tracks 36 even without a coating. For example, in one embodiment, the substrate is a polycarbonate is used, such as a polycarbonate from the GE Lexan family (e.g., LEXAN OQ1030).

Figure 6:
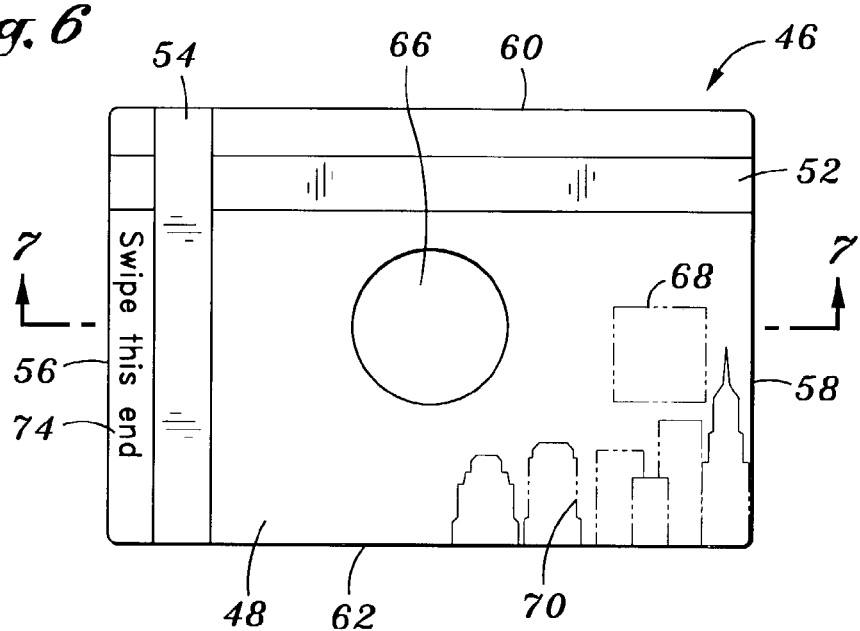
FIG. 6 is a top view showing the first planar surface of a third embodiment of the data storage card made according to the present invention.
Figure 7:
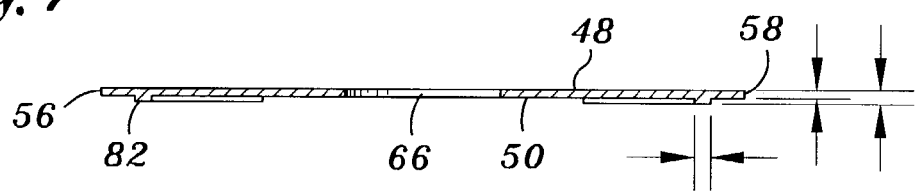
FIG. 7 is a cross-sectional view of a third embodiment of the data storage card made according to the present invention.
Figure 8:
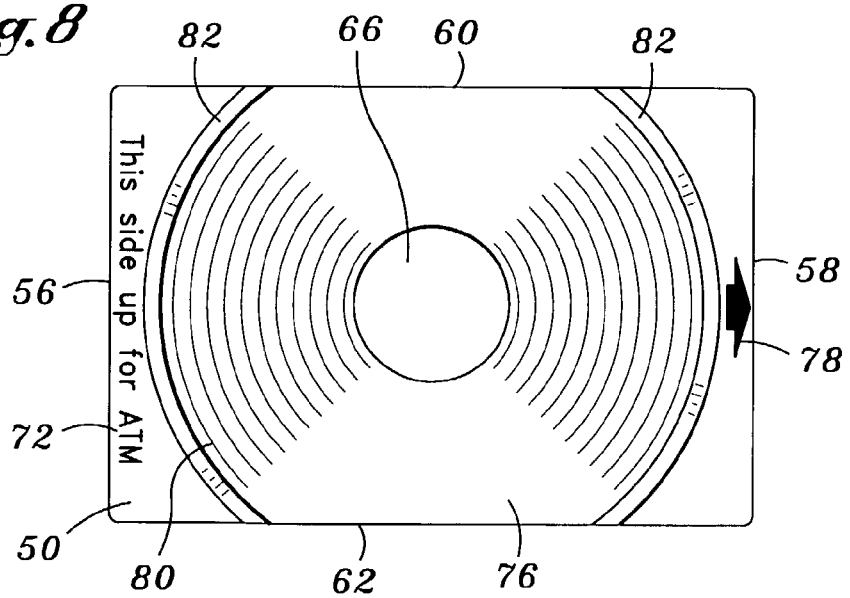
FIG. 8 is a bottom view showing the second planar surface of a third embodiment of the data storage card made according to the present invention.

Referring now to FIGS. 6–8, a third embodiment of the data storage card made according to the present invention is shown. FIG. 6 shows a top planar view, FIG. 7 shows a cross-sectional view, and FIG. 8 shows a bottom planar view of a third embodiment of the data storage card. In all aspects, the third embodiment is identical to the second embodiment except for the configuration of the annular optical data region 76 which incorporates the use of an optical carriage engaging member and an optical surface protector. The ridge 82 functions as an optical carriage engaging member by cooperatively engaging with the recessed grooves of an optical drive carriage. The ridge 82 functions as an optical surface protecting ridge by reducing the amount of friction placed upon the optical region 76 by a magnetic stripe reader, thereby minimizing scratches in the optical region 76 to increase the life of the card body 46. The third embodiment of the present invention is comprised of a substantially planar card body 46, a first planar surface 48, a second planar surface 50, first and second linear magnetic data regions 52 and 54, first and second longitudinal edges 56 and 58, first and second lateral edges 60 and 62, an optical carriage engaging aperture 66, a holographic receiving area 68, a designated artwork area 70, first and second inscription 72 and 74, an annular optical data region 76, a directional indicator 78, and an optical track 80. The annular optical data region 76 in the third embodiment is embedded int eh card body 46. The optical surface protecting ridge 82 should be positioned on the second planar surface 50 such that the card body 46 can cooperatively engage with an optical drive carriage with recessed grooves for 3 inch optical discs. The exact shape or thickness of the ridge 82 is not critical as long as the card body 46 maintains compatibility with the recessed grooves of an optical drive carriage and does not obstruct the feed slot of a roller drive mechanism on an ATM (not shown). Other physical alternations may be made to ensure that the card body 46 fits snugly into the recessed grooves of an optical drive carriage.

Referring now to FIGS. 9–11, a fourth embodiment of the data storage card made according to the present invention is shown. FIG. 9 shows a top planar view, FIG. 10 shows a cross-sectional view, and FIG. 11 shows a bottom planar view of a fourth embodiment of the data storage card. The fourth embodiment of the present invention is comprised of a substantially planar card body 84, a first planar surface 86, a second planar surface 88, first and second linear magnetic data regions 90 and 92, first and second longitudinal edges 94 and 96, first and second lateral edges 98 and 100, an optical carriage engaging aperture 104, a holographic receiving area 106, a designated artwork area 108, first and second inscriptions 110 and 112, an annular optical data region 114, a directional indicator 116, and an optical track 118. The first and second longitudinal edges 94 and 96 may be configured with a rounded shape such that the shape of the card body 84 complements the recessed grooves of an optical drive carriage. Advantageously, the fourth embodiment of the data storage card may provide for a lighter card body 84 in comparison to the substantially rectangular shaped second and third embodiments. The fourth embodiment of the present invention generally resembles the second and third embodiments except that the first and second longitudinal edges 94 and 96 are sized and configured to cooperatively engage to the rotatable spindle of an optical drive carriage. In this respect, the edges are rounded to the shape of an optical drive carriage such that the distance from the first longitudinal edge 94 to the second longitudinal edge 96 is approximately 3 inches, the same measurement of an optical drive carriage. As shown in FIG. 10, the card body 84 may have a thickness T1 which is thinner than a second thickness T2. The thinner portion of the card body 84 provides a magnetic linear data region for use with magnetic stripe readers which require a card having a thinner profile. Thus, the second magnetic stripe 92 may be used with such magnetic stripe readers.

Referring now to FIGS. 12–18, a fifth embodiment of the data storage card made according to the present invention is shown. The fifth embodiment of the present invention is comprised of a substantially planar card body 120, a first planar surface 122, a second planar surface 124, first and second linear magnetic data regions 126 and 128, first and second longitudinal edges 130 and 132, first and second lateral edges 134 and 136, an optical carriage engaging aperture 138, an annular optical data region 140, a positional indicator 142, an aperture sheath 144, an optical surface protecting ridge 146, an indented portion 148, first and second inscriptions 150 and 152, and a visual data region 154.

In order to provide compatibility with both the optical drive carriage and a roller drive mechanism, the aperture sheath 144 prevents the card body 120 from being jammed in a magnetic stripe reader utilizing roller drive mechanisms. Magnetic stripe readers using a roller drive mechanism, such as those found in ATM machines, typically comprise at least one roller to feed the card into the machine and read the magnetic stripe. Some of these machines center the roller such that when a card is inserted into the ATM machine, the roller drive mechanism pulls the card into the machine through the center of the card. Such roller drive mechanism pulls the card into the machine through the center of the card. Such roller drive mechanisms generally require the card to have a substantially planar surface without obstructions. If a card with an aperture disposed in the center of the card is inserted into such an ATM machine, the roller drive may lodge itself in the aperture. The card may then become stuck in the ARM machine and cause the ATM machine to shut itself down or malfunction. At the same time however, an optical carriage engaging aperture formed in the optical carriage engaging aperture 138 may be necessary to properly engage the card body 120 with a rotatable spindle of an optical drive carriage. To prevent the card body 120 from jamming in an ATM machine using a roller drive mechanism, the present invention incorporates a dual-function aperture sheath 144. The aperture sheath 144 may be a movable member comprising an indented portion 148 to facilitate manual displacement in relation to the optical carriage engaging aperture as shown in FIG. 15. The indented portion 148 may be configured with a size and shape sufficient to allow a user's finger nail or a coin to rotate the aperture sheath 144. The aperture sheath 144 may be selectable between a first position exposing the optical carriage engaging aperture to mount the card body 120 on the rotatable spindle of the optical drive carriage and a second position substantially covering the aperture to facilitate transport of the card body 120 in the roller drive mechanism. In the first position, as shown in FIG. 14, the aperture sheath 144 may allow the card body 120 to be used in optical drive carriages such that the aperture is substantially circular in shape and disposed in the center of the card body 120 to cooperatively engage with the rotatable spindle of the optical drive carriage. In the second position, the aperture sheath 144 may allow the card body 120 to be used in roller drive mechanisms. As shown in FIGS. 12 and 13, the aperture sheath 144 may be rotated such that the optical carriage engaging aperture 138 is sufficiently covered by the aperture sheath 144 to prevent the roller drive mechanism from lodging the roller in the aperture. When the aperture sheath 144 is in the second position, as shown in FIG. 12, the roller drive mechanism used in an ATM machine may pull the card body 120 in through the center and pass over the aperture sheath 144. However, if the card body 120 is used with a roller drive mechanism without moving the aperture sheath 144 in the correct position, the roller drive may become jammed in the aperture. Thus, a positional indicator 142 may be provided to ensure proper use of the card body 120. Such a positional indicator 142 may be provided to ensure proper use of the card body 120. Such a positional indicator 142 may be an arrow pointing in the insertion direction with accompanying words such as "ATM." By moving the aperture sheath 144 in a position which covers the optical carriage engaging aperture 138, the positional indicator may line up two lines to form a straight line.

Alternatively, the aperture sheath 144 may be configured as a roller supporting plug disposable in the optical carriage engaging aperture of the optical carriage engaging aperture 138 to facilitate transport of the card body 120 in the roller drive mechanism. In this respect, a removable plug sized and configured to the dimensions of the aperture may be provided. For example, the user may insert the plug into the optical carriage engaging aperture 138 when using the card body 120 with ATM machines and subsequently remove the plug when using the card body 120 with an optical drive carriage. Similarly, the aperture 144 may be configured as a removable sleeve disposable in the optical carriage engageable aperture of the optical carriage engaging aperture 138 to facilitate transport of the card body 120 in the roller drive mechanism. In this respect, a sleeve may be provided which the user slides over the card body 120 to cover all portions of the card body 120 except for the magnetic data stripe 126 to allow the ATM machine to read data from the magnetic data stripe 126.

A first inscription 150 to instruct the user of the proper use of the card may also be provided. Such an inscription 150 may read "Align Red Lines for ATM Use" to indicate that the user must line up the positional indicator 142 by moving the aperture sheath 144 when using the card body 120 in an ATM machine. The second inscription 152, may be provided to indicate to the user that the second linear magnetic data stripe 128 should be used for ATM "swipe-type" magnetic stripe readers.

As shown in FIGS. 13 and 15, the card body 120 may advantageously incorporate an optical surface protecting ridge 146. The ridge 146 may be raised above the second planar surface 124 to allow the card body 120 to cooperatively engage with the rotatable spindle of an optical drive carriage. Preferably, the ridge 146 also protects the optical data region 140 by reducing scratches caused by magnetic stripe readers. For example, the magnetic stripe reader found in ATM machines may cause scratches to be formed on the optical data region 140. In addition, pressure plates found in "swipe-type" magnetic stripe readers also may cause scratches to be formed on the optical data region 140. As shown in FIG. 15, when the card body 120 is inserted into an ATM machine, the ridge 146 provides a space between the ATM machine and the optical data region 140.

Advantageously, at least one area of the first planar surface 122 may incorporate alphanumeric characters in a visual data region 154 that may be imprinted and/or embossed in the card body 120. Account information may be embossed in the designated visual data region 154 for use with older credit card carbon copy systems. The card body 120 may be used in conjunction with such older systems by inserting the card body 120, with the first planar surface 122 facing upward, and by rolling a device over the embossed alphanumeric characters to record an impression of the account information.

Referring now to FIGS. 16–18, a fifth embodiment of the data storage card made according to the present invention is shown. As shown in FIG. 18, the card body 120 with the aperture sheath 144 in the first position for cooperatively engaging the card body 120 with the rotatable spindle of an optical drive carriage 156 may be inserted into the grooves 158 of the optical drive carriage 156. The aperture sheath 144 may be movable between a first position raised above one of the first and second planar surfaces 122 and 124 and a second position substantially coplanar with one of the first and second planar surfaces 122 and 124. As shown in FIG. 17, when the aperture sheath 144 is in the first position, the aperture sheath may be raised above the first planar surface 122. In this respect, raising the aperture sheath 144 prevents the card body 120 from being mistakenly inserted into an ATM machine. By lowering the aperture sheath 144 into the second position substantially coplanar with the first planar surface 122, as shown in FIG. 15, the card body 120 may be properly inserted into an ATM machine.

Referring now to FIGS. 19–21, a sixth embodiment of the data storage card made according to the present invention is shown. The sixth embodiment of the present invention is comprised of a substantially planar card body 160, a first planar surface 162, a second planar surface 164, first and second linear magnetic data regions 166 and 168, first and second longitudinal edges 170 and 172, first and second lateral edges 174 and 176, an optical carriage engaging aperture 178, a first inscription 180, an annular optical data region 182, an aperture sheath 184, an optical surface protecting ridge 186, an indented portion 188, a visual data region 190, and an optical carriage engaging member 192. In all respects, the sixth embodiment of the data storage card is identical to the firth embodiment as discussed above with some of the following exceptions.

The indented portion 188 of the aperture sheath 184 may be linearly slideable between a first position exposing the optical carriage engaging aperture 178 to mount the card body 160 on the rotatable spindle of the optical drive carriage and a second position substantially covering the aperture 178 to facilitate transport of the card body 160 in the roller drive mechanism. In this respect, the aperture sheath 184 allows the card body 160 to be used in a magnetic stripe reader utilizing a roller drive mechanism. The aperture sheath 184 prevents the roller from jamming the card body 160 in the magnetic stripe reader or ATM machine by substantially cover the aperture 178.

In addition, the optical carriage engaging member 192 may be configured with corners which are complementary to the recessed grooves of an optical drive carriage. The optical surface protecting ridge 186 may be a separately raised portion of the card body 160 such that the ridge 186 reduces scratches from being formed on the optical data region 182 while the optical carriage engaging member 192 may allow the card body 160 to fit snugly into an optical drive carriage. Alternatively, the ridge 186 may serve the dual purpose as an optical surface protecting ridge and the optical carriage engaging member.

Figure 22:
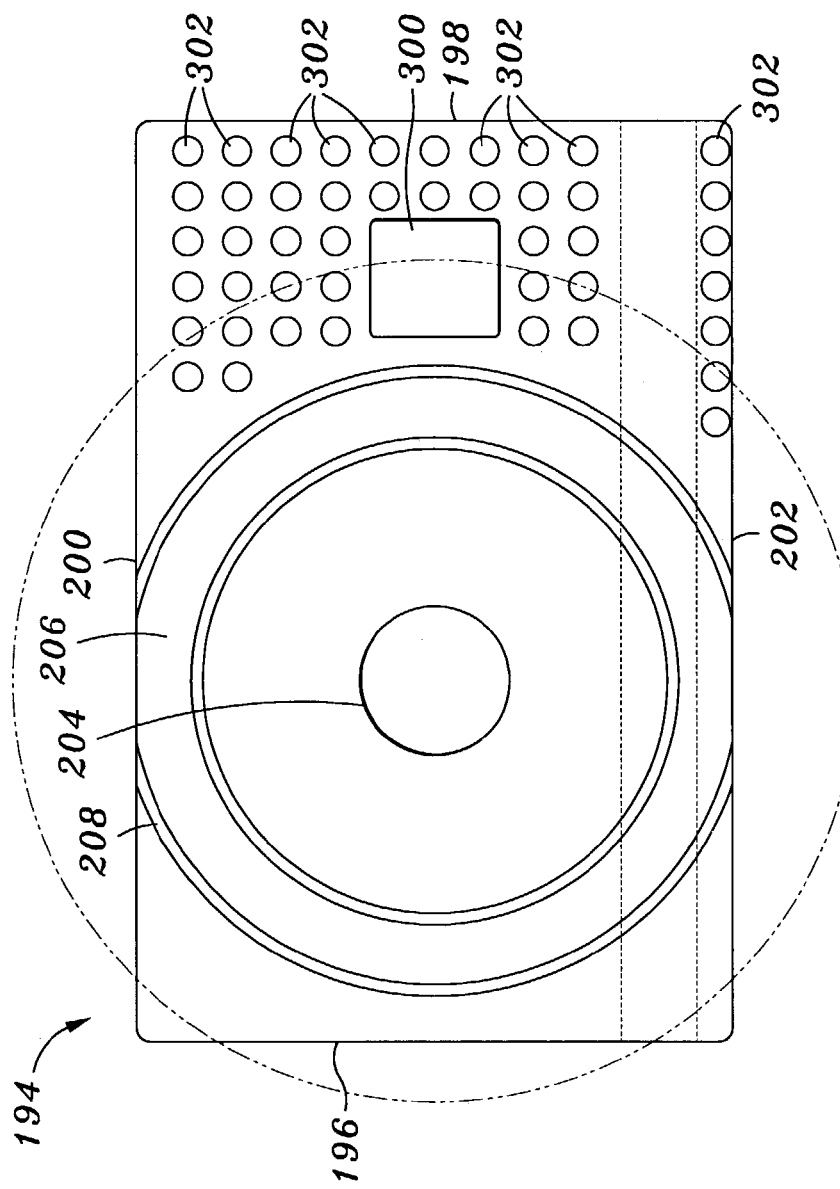
FIG. 22 is a bottom view of a seventh embodiment of the data storage card made according to the present invention.

Referring now to FIG. 22, a seventh embodiment of the data storage card made according to the present invention is shown. The seventh embodiment of the present invention is substantially similar to the third embodiment of the present invention shown in FIGS. 6–8 as discussed above with the following exceptions. As shown in FIG. 22, the seventh embodiment comprises a substantially planar card body 194, first and second longitudinal edges 196 and 198, first and second lateral edges 200 and 202, an optical carriage engaging aperture 204 positioned off-center, an optical data region 206, an optical surface protecting ridge 208, a semiconductor memory chip 300 embedded in the card body 194, and plurality of recesses 302 for reducing the weight of the card body 194 in proportion to the weight of the semiconductor memory chip 300. A semiconductor memory chip 300 too large to properly fit on the card body may then require the optical carriage engaging aperture 204 to be positioned off-center. The optical carriage engaging aperture 204 may be positioned about the periphery of the center point of the card body 194, which may be equidistant from the longitudinal and lateral edges to allow for the semiconductor memory chip 300 to be embedded in the card body 194. By positioning the optical carriage engaging aperture 204 off-center and embedding the semiconductor memory chip 300 into the card body 194, additional weight is added to the card body 194. Thus, when the card body 194 is cooperatively engaged with the rotatable spindle of an optical drive carriage, the card body 194 may become too heavy to achieve a sufficient rotational velocity for reading the data from the optical data region 206. Thus, by addition a plurality of recesses 302 on the card body 194, the overall weight of the card body 194 may be reduced to compensate for the added weight from the semiconductor memory chip 300.

Preferably, the memory chip 300 is sized sufficiently small and thin to allow the chip to be embedded into the card body 194 with minimal addition of weight. For example, a smart media card or flash memory chip may be utilized with the present invention. As one of ordinary skill in the art may appreciate, smart media cards are relatively thin and are well configured for portable electronic devices. Such cards may be produced with small data capacities to very high capacities (as much as 64 Megabytes).

Referring now to FIGS. 22A, 22B, AND 22C, an eighth embodiment of the present invention is shown. The eighth embodiment of the present invention may include a substantially planar card body 328, first and second longitudinal edges 332 and 334, first and second lateral edges 336 and 338, an optical carriage engaging aperture 326, which may be disposed in the center of the card body 328, an annular optical data region 340, a first linear magnetic data stripe 342, a second linear magnetic data stripe 344, a first planar surface 346 and a second planar surface 348, optical surface engaging members 350, and a plurality of recesses 352. The eighth embodiment is substantially similar to the seventh embodiment of the present invention as shown in FIG. 22 with the following exceptions. The optical carriage engaging aperture 326 may be positioned in approximately the center point of the card body 328 where the size of the semiconductor memory chip 330 is sufficiently small enough to fit on the second surface 348 of the card body 328. The semiconductor memory chip 300 may require more space than is available on the first surface 346 while the optical carriage engaging aperture 326 is position in the center of the card body 328. Recesses 352 formed in the card body 328 may be positioned on the second surface 348 such that the mass of the semiconductor chip 330 added to the card body 328 may be offset by the mass removed by the plurality of recesses 352. In this respect, the recesses 352 may be positioned on the second surface 348 such that the card body 328 may be balanced about the x-axis and y-axis of the card. In other words, the recesses 352 may be of equal number and size on each side of the semiconductor chip 330. As shown in FIG. 22B, the recesses 352 may be positioned such that the recesses 352 remove a portion of the card body 328 but the recesses 352 may be configured such that the recesses 352 do not extend completely through the card body 328.

Figure 23:
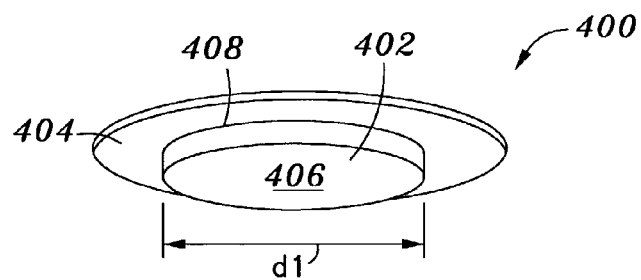
FIG. 23 is a perspective view of a covering member capable of extending over and within an optical carriage engaging aperture on a data storage card.

Turning now to FIG. 23, one embodiment of a covering member 400 is illustrated. As shown, the covering member includes a plug 402 and a seal 404.

The plug 402 is short and cylindrical so as to define a bottom surface 406 and a top surface 408. In one embodiment, the diameter of the plug 402 (d1) is slightly smaller than the that of the optical carriage engaging aperture 324 (d2) included on the data storage cards, and the length of the plug 402 is approximately equal to the optical carriage engaging aperture 324.

The seal 404 is flat and disc-shaped and is attached to the top surface 408 of the plug 402. The diameter of the seal 404 is preferably larger than the diameter of the plug 402 so as to extend radially from the top surface 408. Also, the seal 404 is made out of an elastic material. Specifically, in one embodiment, the seal 404 is made of GE HCR, and in another embodiment, the seal 404 is made of GE LIM.

Figure 24A:
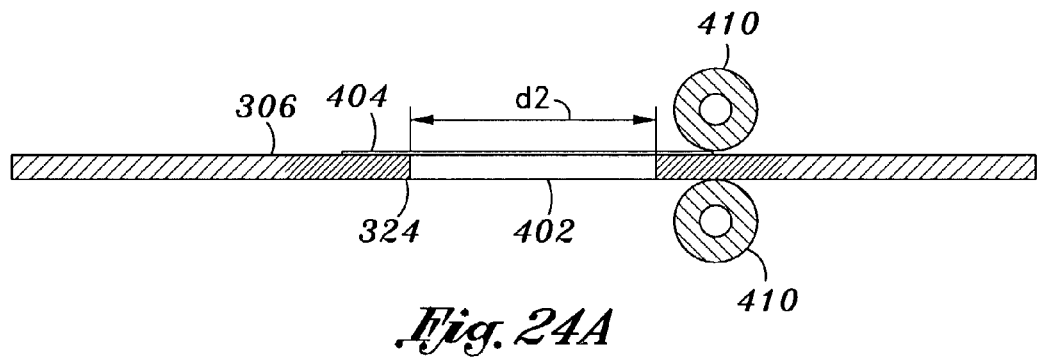
FIG. 24A is a cross sectional view of a ninth embodiment of a data storage card with the covering member of FIG. 23, the data storage card being fed into a roller-type data reader.
Figure 24B:
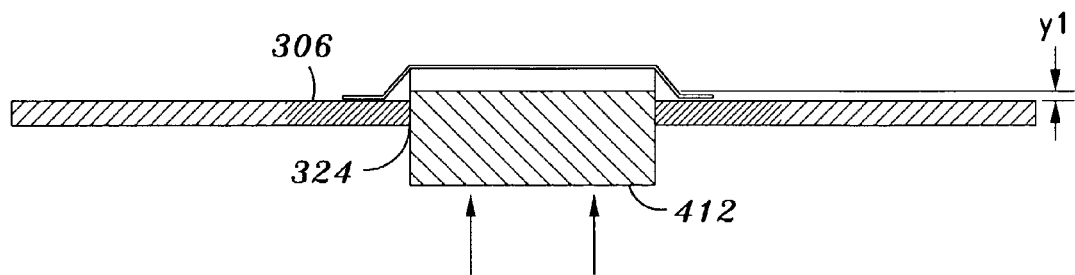
FIG. 24B is a cross sectional view of a ninth embodiment of a data storage card with the covering member of FIG. 23, the data storage card engaged within an optical data reader.

Turning now to FIGS. 24A and 24B, the covering member 400 is shown incorporated into a ninth embodiment of the data storage card. In the embodiment shown, the covering member 400 is positioned such that the seal 404 is connected to the first planar surface 306 of the data storage card. In one embodiment, the seal 404 is connected to the first planar surface 306 by adhesives or other method commonly known in the art. In another embodiment, especially that in which GE HCR or GE LIM makes up the seal 404, the seal 404 itself has adhesive properties to thereby attach the seal 404 to first planar surface 306.

As such, when the covering member 400 is in its free state (FIG. 24A), the plug 402 resides within the optical carriage engaging aperture 324. In other words, the covering member 400 extends over and within the aperture 324. Thus, the aperture 324 is less likely to cause the data storage card to become jammed within a data reader. More specifically, as the data storage card is fed into a data reader that has rollers 410 and the rollers 410 move over the aperture 324, one set of rollers 410 contacts the seal 404 and the other set of rollers 410 contacts the bottom surface 406 of the plug 402. Thus, the covering member 400 advantageously provides a point of contact for the rollers 410 over the length of the data storage card such that the data storage card is unlikely to get stuck due to the aperture 324.

Moreover, as explained above, data is often retrieved from the data storage card using an optical data reader that has a common rotational member 412. In conventional units, when the data storage card is inserted, the rotational member 412 automatically moves into the optical carriage engaging aperture 324 and attaches itself thereto in order to spin and read data from the data storage card. As such, when the rotational member 412 moves into the optical carriage engaging aperture 324, it abuts against the bottom surface 406 of the plug 402, moving the plug 402 upward and out of the aperture 324. Then, the rotational member 412 is able to engage with the data storage card. As the data storage card is removed from the optical data reader, the rotational member 412 moves out of the aperture 324, and the seal 404 resiliently biases the plug 402 back within the aperture 324.

Thus, a user can insert the data storage card into a variety of data readers, and the covering member 400 automatically configures the data storage card for proper insertion and data retrieval. Advantageously, the data storage card is less likely to become stuck in a data reading machine.

In another embodiment not shown, the covering member 400 includes a seal 404 on both the first surface 306 and second surface 308. As in the embodiment shown in FIG. 23 and FIGS. 24A and 24B, the seals 404 of this embodiment resiliently flex out of the way of the rotational member 412.

In still another embodiment, the covering member 400 includes a seal 404, extending over the aperture 324, on the first surface 306 only. As in the embodiment shown in FIG. 23 and FIGS. 24A and 24B, the seal 404 of this embodiment resiliently flexes out of the way of the rotational member 412, but also allows proper contact with the rollers 410 to thereby prevent the card from getting stuck.

Figure 25:
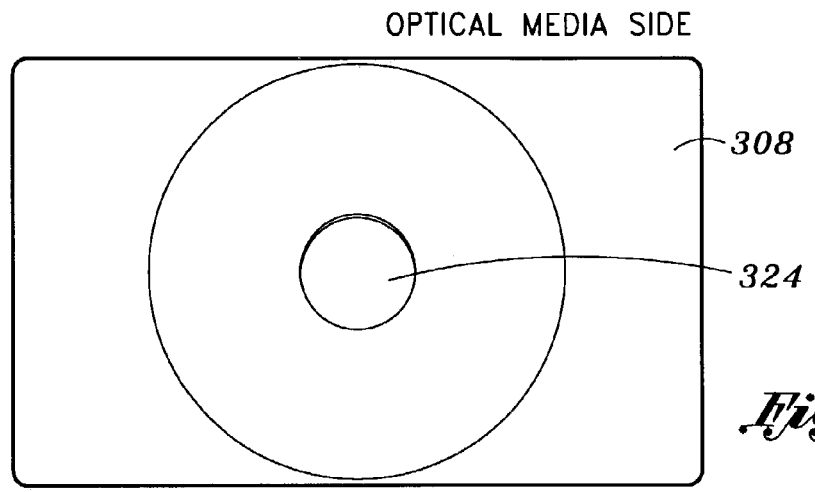
FIG. 25 is a top view of tenth embodiment of a data storage card made according to the present invention.
Figure 26:
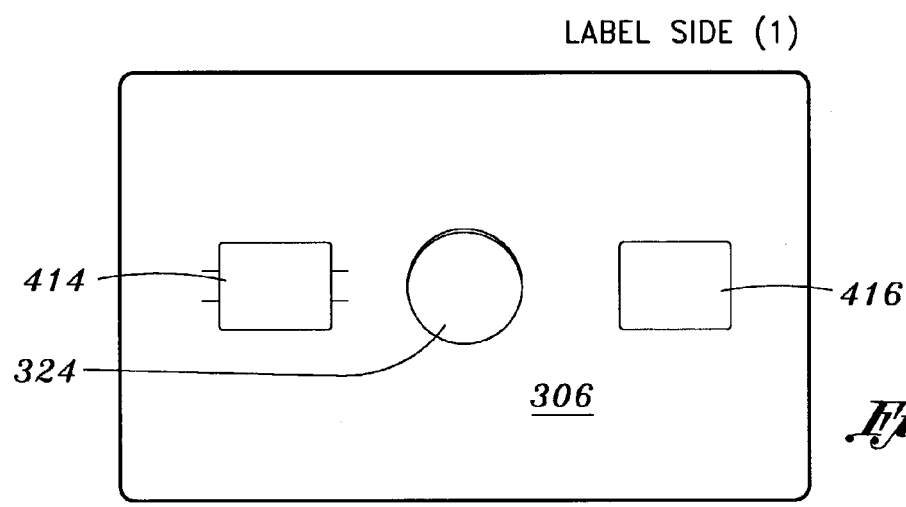
FIG. 26 is a bottom view of the tenth embodiment of the data storage card of FIG. 25 with a semiconductor memory chip and a counterbalance weight.

Turning now to FIGS. 25 and 26, a tenth embodiment of the data storage card of the present invention is shown. Beginning with FIG. 25, the second planar surface 308 is shown with an optical data region 318 positioned thereon, similar to the embodiments described above. In FIG. 26, the first planar surface 306 is shown with a semiconductor memory chip 414 embedded thereon. Also, a counterbalance weight 416 is attached to the first planar surface 306. The counterbalance weight 416 can take on many shapes, but it preferably weighs an amount and is positioned in such a way so as to balance the data storage card as it spins. For instance, in the embodiment shown, the counterbalance weight 416 is approximately the same size and weight as the semiconductor memory device 414, and the counterbalance weight as well as the semiconductor memory device 414 are equally spaced on opposing sides of the aperture 324. Thus, as the data storage card is spun for retrieval of the optical data, the semiconductor memory chip 414 is balanced by the counterbalance weight 416 such that data can be properly retrieved.

Figure 27:
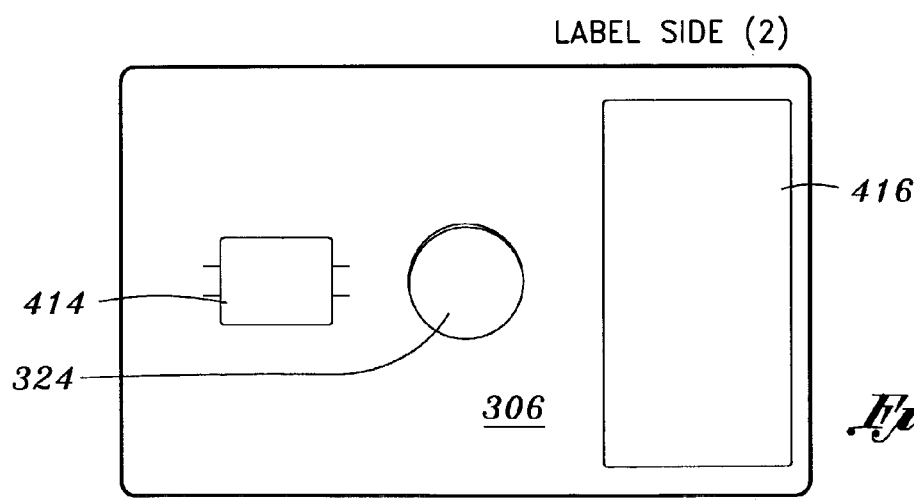
FIG. 27 is a bottom view of an eleventh embodiment of a data storage card with a semiconductor memory chip and a counterbalance weight.

An eleventh embodiment of the data storage card shown in FIG. 27 is similar to the embodiment shown in FIGS. 25 and 26, except that the counterbalance weight 416 is configured differently. On one side of the aperture 324 is embedded the semiconductor memory chip 414, and on the opposing side of the aperture 324 is a deposit of material evenly distributed across the width of the card so as to act as the counterbalance weight 416. In one embodiment, material that forms the card body 304 is more heavily distributed on one side of the aperture 324 in order to form this configuration of the counterbalance weight 416.

The counterbalance weight 416 shown in FIGS. 26 and 27 can be made out of a variety of materials. For instance, in one embodiment, the counterbalance weight 416 is made out of polycarbonate. In another embodiment, the counterbalance weight 416 is made out of a film.

Figure 28A:
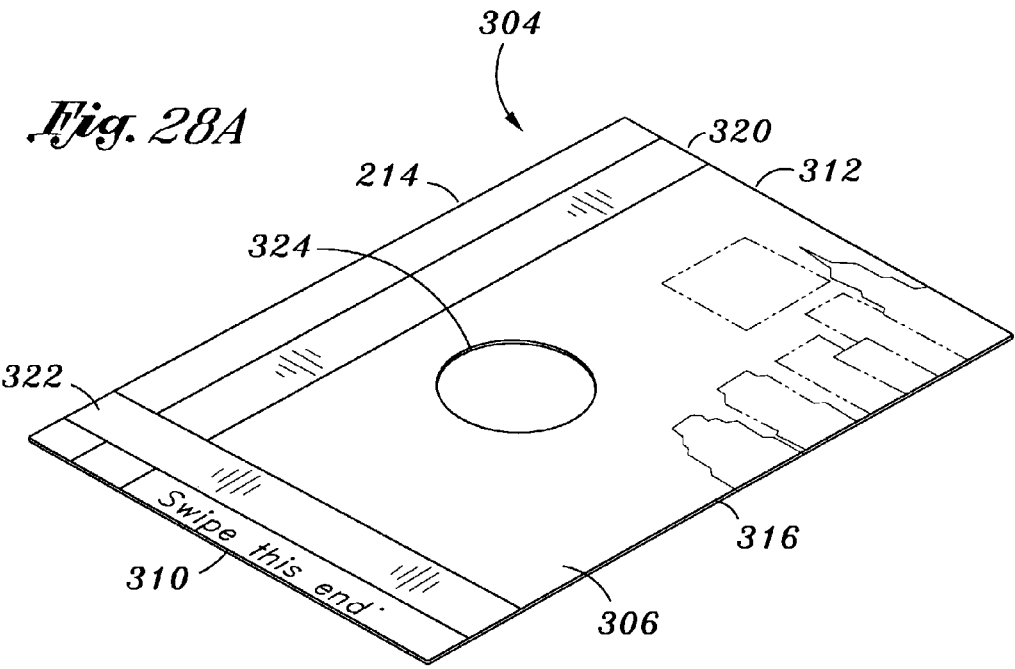
FIG. 28A is a top perspective view of a twelfth embodiment of a data storage card of the present invention.
Figure 28B:
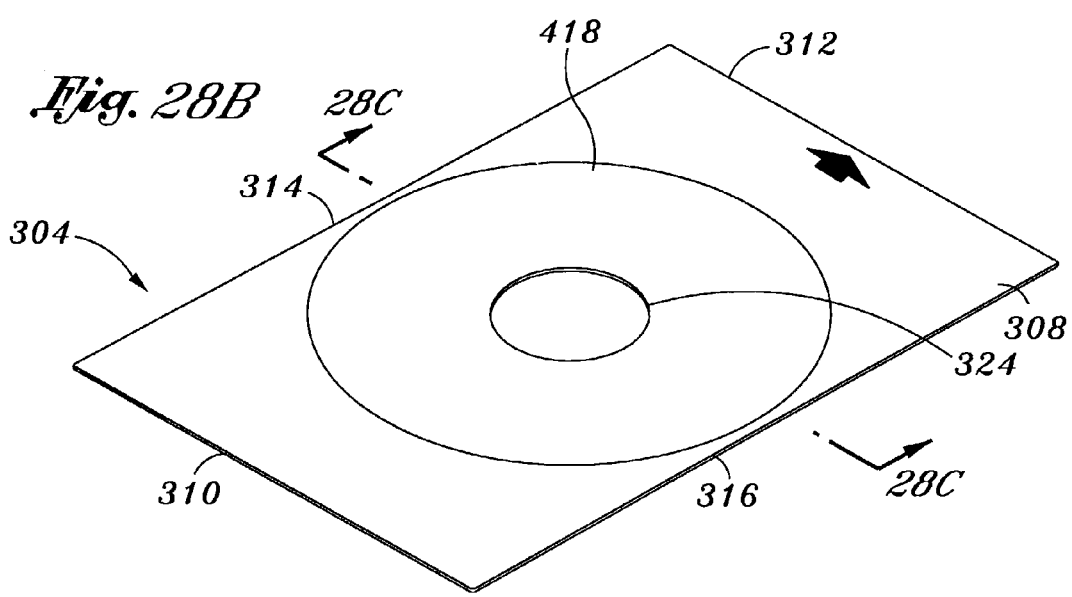
FIG. 28B is a bottom perspective view of the twelfth embodiment of the data storage card of FIG. 28A.
Figure 28C:
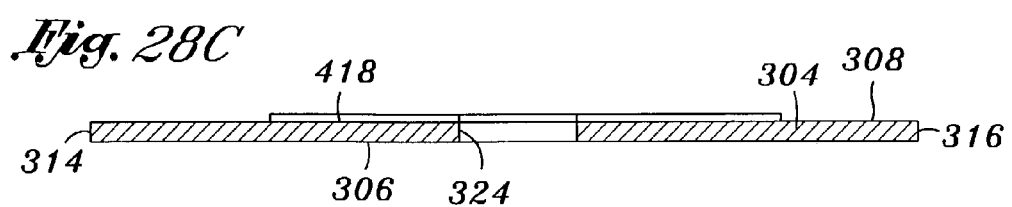
FIG. 28C is a cross sectional view of the twelfth embodiment of the data storage card of FIGS. 28A and 28B.
Figure 31A:
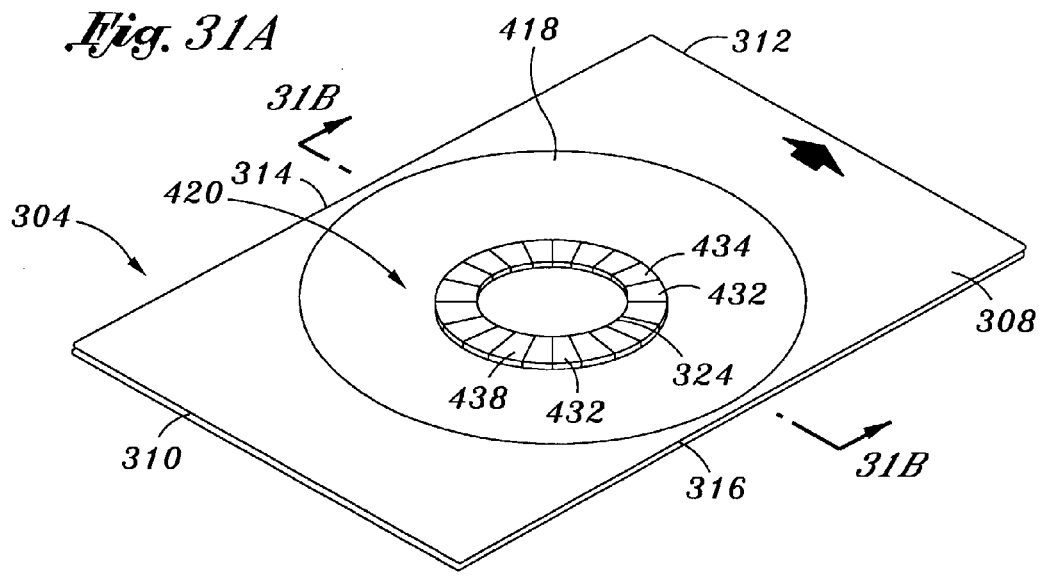
FIG. 31A is a bottom perspective view of a data storage card with another alternative embodiment of a spacer attached thereto, the spacer shown in an extended configuration.
Figure 31B:
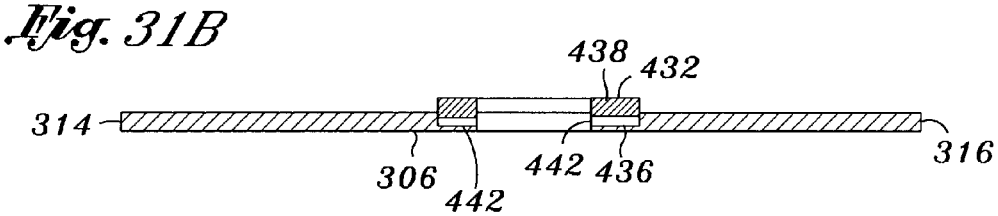
FIG. 31B is a cross sectional view of the data storage card taken from FIG. 31A.
Figure 31C:
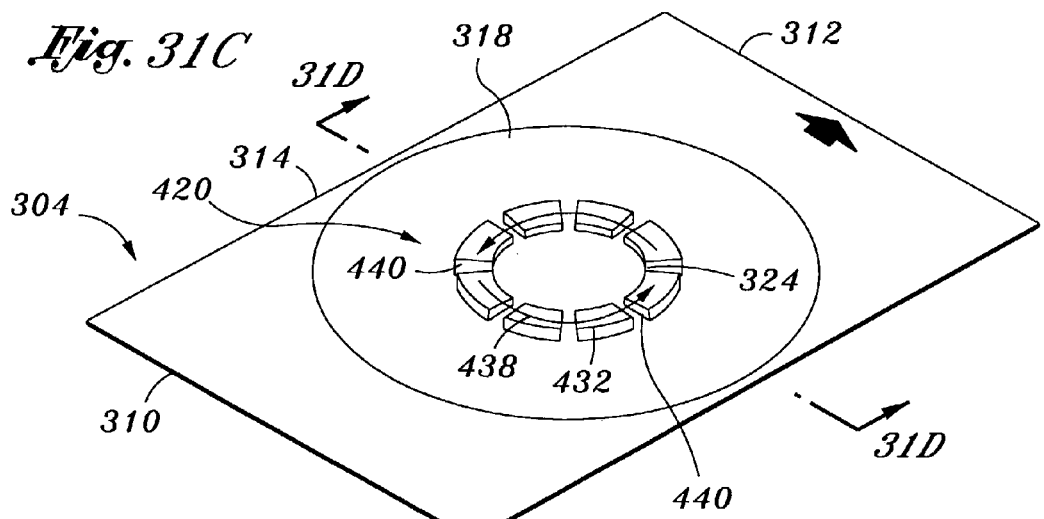
FIG. 31C is a bottom perspective view of the data storage card of FIG. 31A with the spacer shown in a retracted configuration.
Figure 31D:
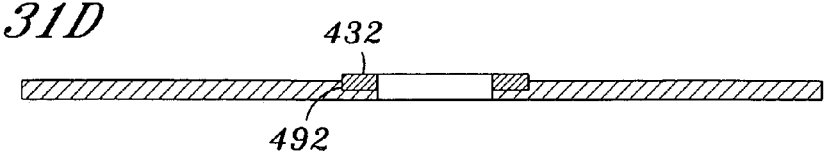
FIG. 31D is a cross sectional view of the data storage card taken from FIG. 31C.

Turning now to FIGS. 28A, 28B, and 28C, a twelfth embodiment of the data storage card is illustrated. As is specifically shown in FIGS. 28B and 28C, the data storage card includes an optical film 418. The optical film 418 is made out of a film that is capable of retaining optical data thereon. Once the optical data is written onto the optical film 418, the optical data region 318 is formed as described above in relation to FIGS. 1A through 27. Preferably, the optical film 418 is a thin layer of material positioned on the second layer 308. As such, the overall cross section of the data storage card is relatively thin and largely continuous as shown in FIG. 28C. For instance, in one embodiment, the data storage card measures 0.76 mm in thickness. (The film 418 shown in FIG. 28C is not drawn to scale and is only shown for clarity. In the preferred embodiment, the film 418 is largely flush with the second surface 308). Advantageously, the thin cross section allows the data storage card to be inserted into standard magnetic card readers without getting stuck.

Preferably, the optical film 418 is very durable and is able to withstand extended use. For instance, in one embodiment the optical film 418 is made out of a material that is scratch resistant, is heat resistant, blocks ultraviolet light, and is flexible such that the data storage card can be used for extended periods. In one embodiment, the optical film 418 is made out of a polyethalyne material, such as GE LIM.

The durability of the optical film 418 prevents damage to the optical data even though the data storage card is stored inside a wallet, withdrawn from the wallet, sat upon while in a wallet, and the like.

Turning now to FIG. 29, a thirteenth embodiment of the data storage card is illustrated. The data storage card illustrated is similar to the embodiments described above, except that this embodiment includes a spacer 420. In the embodiment shown, the spacer 420 includes an anchor 422 and a disk 424.

The anchor 422 is a hollow, cylindrical unit and the outside diameter of the anchor 422 is slightly smaller than the diameter of the optical carriage engaging aperture 324 such that the anchor 422 can be frictionally fit inside the aperture 324.

The disk 424 is a flat, hollow, cylinder that includes a first surface 426 and a second surface 428, and the first surface 426 is attached to the anchor 422 such that the axes of both the disk and the anchor 422 are aligned. In the embodiment shown, when the anchor 422 is frictionally fit inside the aperture 324, the first surface 426 is adjacent the first surface 306 of the card body 304. Also the second surface 428 of the disk 424 extends upwardly therefrom. Preferably, the thickness of the disk 424 is such that the second surface 428 can properly abut against standard abutment members (not shown) inside an optical data. (Such abutment members serve to stabilize a spinning optical disc.) Preferably, the spacer 420 can be removed by axially pulling it from the aperture 324. Advantageously, the spacer 420 allows the user to selectively alter the cross sectional profile of the card body 304. As such, the spacer 420 can be fit inside the aperture 320 to increase the cross sectional thickness around the aperture 320 for abutment with components of the optical data reader, and such abutment preferably inhibits off-balance spinning of the data storage card. Also, the spacer 420 can be removed from the card body 304 to thereby restore the original profile of the data storage card, and the reduced cross sectional thickness allows the card body 304 to pass through a magnetic card reader.

It is understood that the embodiment of the spacer 420 shown in FIG. 29 is simply one embodiment of a spacing member used to selectively alter the overall profile of the card body 304. Thus, changes could be made to the spacer 420, such as altering the attachment means or altering the size of the spacer 420, without departing from the spirit of the invention.

Turning now to FIGS. 30A and 30B, an alternative embodiment of the spacer 420 is illustrated. As shown, the spacer 420 comprises a plurality of flaps 430. In the embodiment shown, the typical flap 430 is rectangular and is hingedly attached to the first surface 306. In a closed position (FIG. 30A), the flaps 430 lie parallel and are preferably flush with the first surface 306. In an open position (FIG. 30B), the flaps 430 extend perpendicularly from the first surface 306. Thus, a user can selectively open and close the flaps 430, depending on the use of the data storage card. For instance, if the data storage card is to be used in a standard magnetic data reader, the flaps 430 should be closed as is shown in FIG. 30A in order to maintain a thinner, more uniform profile of the data storage card. Alternatively, if the data storage card is to be used in a standard optical data reader, the flaps 430 should be opened as is shown in FIG. 30B such that the top-most portion of the opened flaps 430 can abut against standard members in the optical data reader for proper, balanced spinning of the data storage card.

Turning now to FIGS. 31A through 31D, another embodiment of the spacer 420 is illustrated. In this embodiment, the spacer 420 comprises a plurality of wedges 432 that collectively make up an extendable spacer 434. Each wedge 432 is a curved member that has a bottom surface 436, a top surface 438, and sloped sides 440. On the typical wedge 432, the bottom surface 436 is slidably attached to the second surface 308, and the trajectory of this sliding attachment is largely directed outward from the second surface 308 and around the aperture 324. As is also shown in this embodiment in FIG. 31D, a plurality of cavities 442 are formed below the second surface 308. Each cavity 442 is shaped to partially contain a corresponding wedge 432, and their sliding attachment allows each wedge 432 to slide in or out of their respective cavity 442. Preferably, a user can slide the wedges 432 out of the cavities 442 by hand. As the wedges 432 slide out of the corresponding cavities 442 (FIGS. 31A and 31B), the wedges 432 extend further off of the second surface 308, and also the sloped sides 440 contact the sloped sides 440 of adjacent wedges 432 to make the spacer 420 a nearly continuous ring. When extended, the top surfaces 438 of the wedges 432 provide an abutment surface for the standard optical data reader, and such abutment provides stability for the data storage card when spinning. Reversing the sliding direction of the wedges 432 causes each wedge 432 to slide into the respective cavities 442 (FIGS. 31C and 31D) and the top surfaces 438 of the wedges 432 are almost flush with the second surface 308 of the card body 304. Thus, the user can selectively change the overall cross sectional profile depending on whether the data storage card is used in a magnetic data reader or an optical reader.

Figure 32:
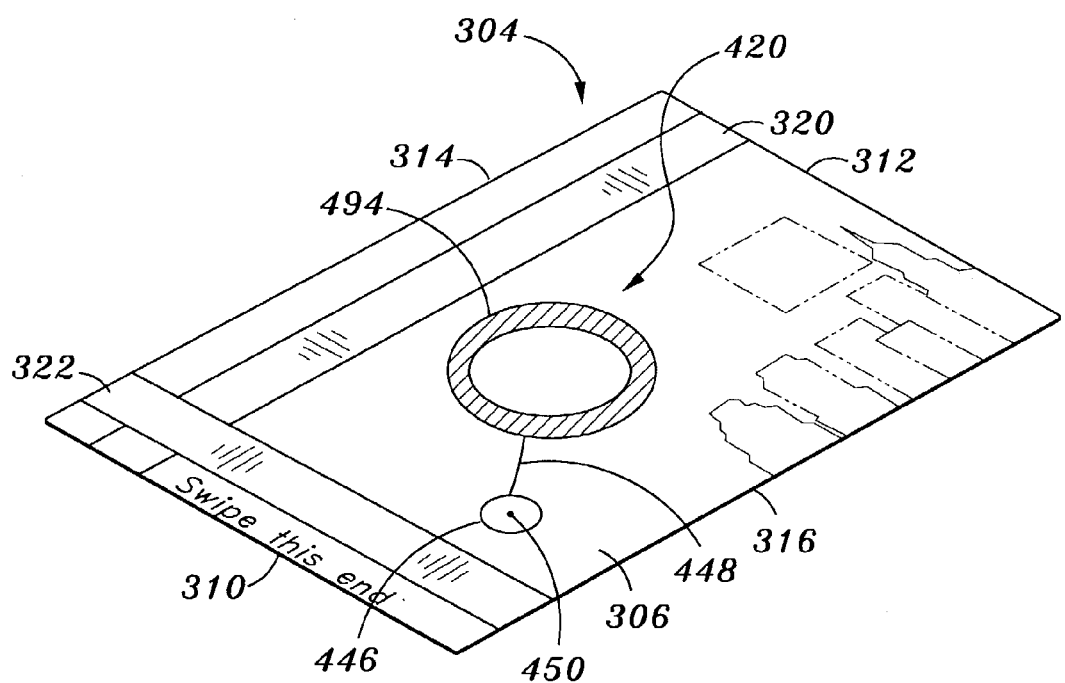
FIG. 32 is a top perspective view of a data storage card with an alternative embodiment of the spacer attached thereto.

Turning now to FIG. 32, another alternative embodiment of the spacer 420 is illustrated. As shown, the spacer 420 comprises an extendible region 444. The extendible region 44 is an area of material on the first surface 306 that can selectively expand and extend off of the first surface 306. More specifically, the extendible region 444 is made out of a highly thermally expandable and electrically resistive material. In the embodiment shown, the extendible region 444 is a ring of material centered around the aperture 324.

Also, this embodiment includes a power source 446, such as a common battery, which is electrically coupled to the extendible region 444 with a wire 448. The power source 446 includes a standard switch 450 that allows a user to regulate the flow of electricity from the power source 446 to the extendible region 444. Preferably, the power source 446 and wire 448 are substantially embedded within the first surface 306 in order to make the overall cross sectional profile of the card as thin as possible.

If the switch 450 is turned to an "on" position, electricity flows from the power source 446, through the wire 448 and to the extendible region 444. The electrical resistance of the extendible region 444 causes the same to heat up. The rise in temperature causes the extendible region 444 to extend off of the first surface 306 because the extendible region 444 has high thermal expansion properties as explained above. Once extended, the extendible region 444 provides a proper abutment surface against which standard components of an optical data reader can press against for stabilizing the spinning data storage card. Alternatively, if the switch is turned to an "off" position, electricity stops flowing through the wire 448, thereby eliminating the electrical resistance through the extendible region 444 and cooling the same. Such cooling causes the extendible region 444 to shrink, and the data storage card returns to its original smaller thickness. Thus, like the other embodiments of the spacer 420, this embodiment of the spacer 420 allows a user to selectively change the overall cross sectional profile of the data storage card. Such selectivity allows the user to make the data storage card thinner such that the card will properly fit inside a magnetic data reader, and it allows the user to make the data storage card thicker such that the card will properly abut against components for balanced spinning inside an optical data reader.

It is noted that the various embodiments of the spacer 420 shown in FIGS. 29 through 32 could be altered by one skilled in the art without departing from the spirit of the invention. For instance, the spacer 420 itself could extend from either the first surface 306 or second surface 308, depending on the orientation of abutment members inside the optical data reader, without departing from the spirit of the invention.

Figure 33:
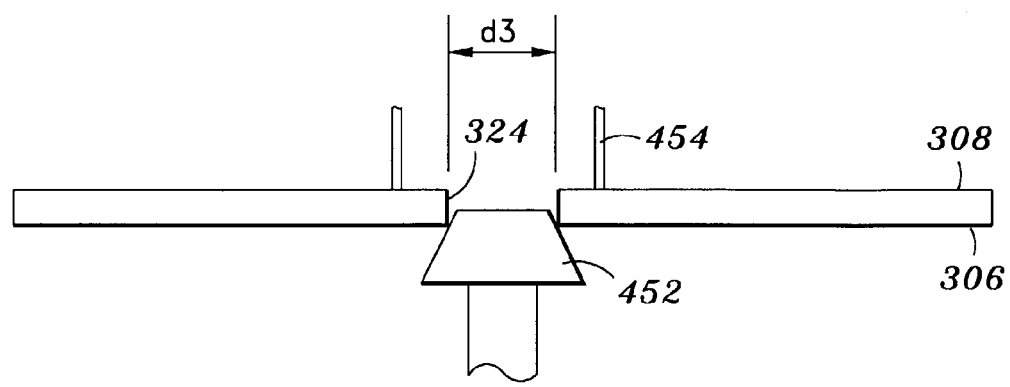
FIG. 33 is a cross sectional view of a data storage card with an undersized aperture formed therethrough, the data storage card shown positioned on an optical data reader.

Turning now to FIG. 33, another embodiment of the data storage card is illustrated. As shown, the data storage card of this embodiment is quite similar to the other embodiments described above, except that the aperture 324 has a smaller diameter (d3) than the standard diameter of optical data discs. More specifically, standard optical discs have apertures measuring between 15 and 15.1 millimeters; however the diameter (d3) of the aperture 324 is smaller than this standard diameter. In one embodiment, the diameter (d3) of the aperture 324 measures less than 11.1 millimeters. Due to the smaller diameter of the aperture 324, the data storage card sits axially higher on the conical surface of the spindle 452 that is commonly included in conventional optical data readers. Once on the spindle 452, abutment members 454, typically included in conventional optical data readers, compressively contact the second surface 308 of the data storage card and stabilize the spinning card. Thus, even where the data storage card is thinner, the smaller diameter aperture 324 allows the card to sit axially higher on the spindle 452 so that the abutment members 454 can contact the second surface 308 at the normal position. Advantageously, the card can be made thinner so that it fits inside a magnetic card reader but yet the thinner card can still properly be read inside an optical data reader.

Figure 34:
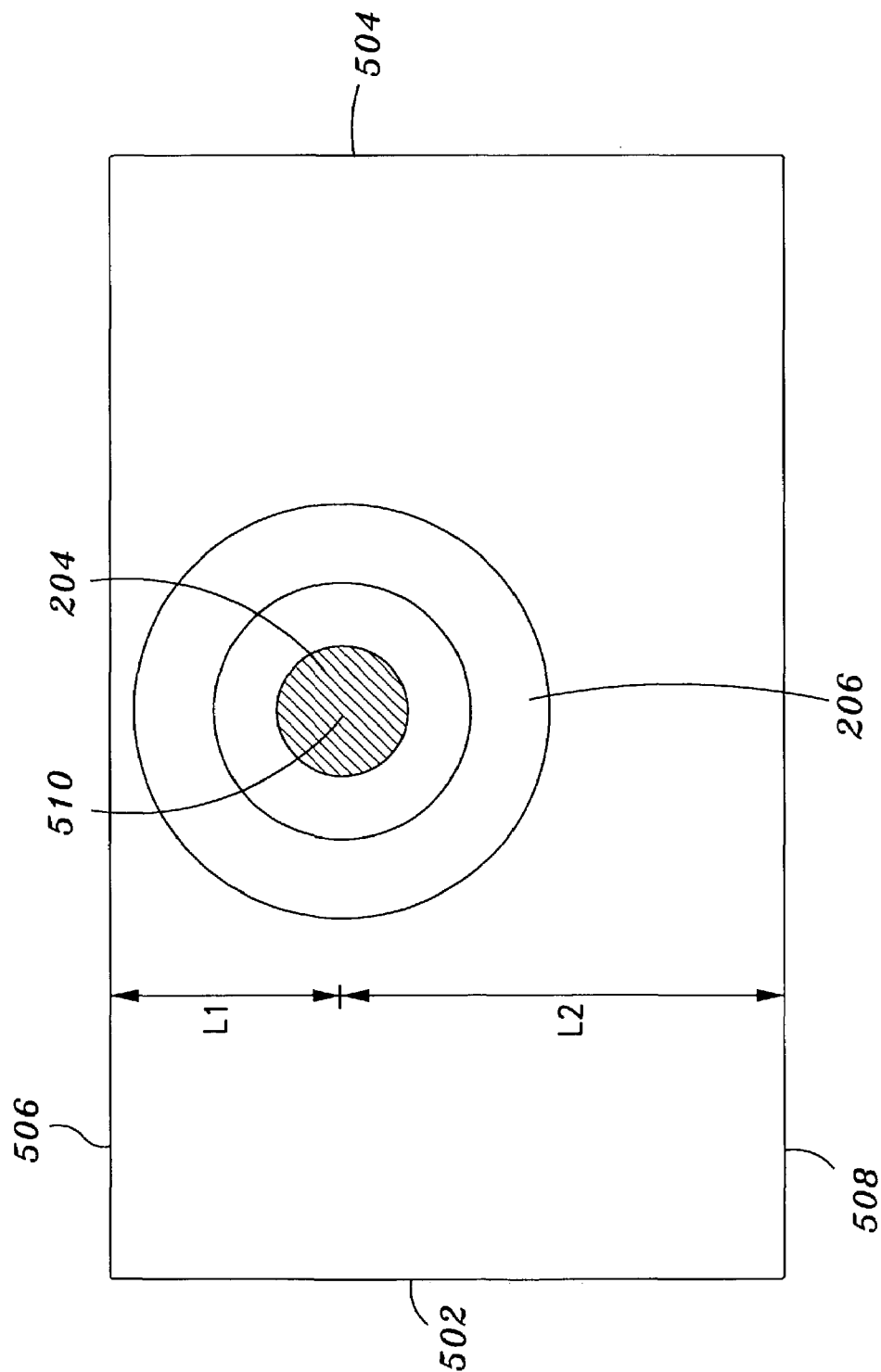
FIG. 34 is a top view of a data storage card with an optical carriage engaging aperture positioned off-center in the lateral direction.

Turning now to FIG. 34, another embodiment of the data storage card is illustrated. As shown, the data storage card of this embodiment is quite similar to the other embodiments described above, except that the optical carriage engaging aperture 204 is laterally off-center as opposed to being longitudinally off-center as shown in FIG. 22. More specifically, the card is rectangular so as to include two opposing lateral sides 502, 504 and two opposing longitudinal sides 506, 508, and the longitudinal sides 506, 508 are longer than the lateral sides 502, 504. The aperture 204 is centered at a center point 510, and the centerpoint 510 is closer to one of the longitudinal sides 506 (i.e., L1 is less than L2).

As stated above, rollers in a feed-type magnetic data reader often contact the card along the center of its longitudinal axis as the card feeds in and out of the reader, and a centrally-positioned aperture 204 can cause a loss of contact with such a roller. The loss of contact can cause the card to become stuck in the reader. Offsetting the aperture 204 in the lateral direction as shown in FIG. 34 can allow rollers to fully contact the card surface as it feeds in and out, thereby inhibiting the card from becoming stuck.

It is recognized that offsetting the aperture 204 in the lateral direction as shown in FIG. 34 may limit the amount of optical data that can be included on the card. Thus, in order to allow the aperture 204 to be laterally offset as well as maintain sufficient optical data on the card, the written optical data can be spaced closer together. More specifically, standard optical data is written with a track width of 1/10 microns, the space between the tracks is typically 1.6 microns +/−0.1 microns, and the length of pits and lands is 3 to 17 microns. In one embodiment, this spacing could be changed in order to fit more optical data on the optical data region 206.

Additional modifications and improvements of the present invention may also be apparent to those of ordinary skill in the art. Thus, the particular combination of parts described and illustrated herein is not intended to serve as limitations of alternative devices within the spirit and scope of the invention.

What is claimed is:

1. A data storage card having optical and magnetic data storage regions, and formed to cooperatively engage both a magnetic stripe reader and an optical data reader, the card comprising:
   a) a card body defining first and second opposed generally planar surfaces;
   b) at least one annular optical data storage region disposed on at least one of the first and second surfaces of the card body;
   c) at least one magnetic linear data storage region disposed on at least one of the first and second surfaces;
   d) an optical carriage engaging aperture formed in the card body to engage a drive mechanism of an optical data reader; and
   e) a covering member attached to at least one of the first and second surfaces and extending over the aperture, the covering member being resiliently displaceable away from the aperture to allow engagement of the aperture to a drive mechanism of an optical data reader.

2. The data storage card of claim 1, the covering member comprising a plug and a seal, wherein the seal is connected to at least one of the first and second surfaces and wherein the seal is connected to the plug, wherein the plug is positioned within the optical carriage engaging aperture when the covering member is in a first position and wherein the plug is disposed substantially outside the optical carriage engaging aperture when the covering member is in a second position.

3. The data storage card of claim 2, wherein the plug includes a top surface and a bottom surface, and wherein the seal is attached to the top surface of the plug, and wherein the bottom surface is positioned a first distance above one of the first and second surfaces when the covering member is in the second position.

4. The data storage card of claim 1, the covering member comprising a seal, wherein the seal is connected to at least one of the first and second surfaces and substantially covers the optical carriage engaging aperture.

5. A data storage card having optical and magnetic data storage regions, and formed to cooperatively engage both a magnetic stripe reader and an optical data reader, the card comprising:
 a) a card body defining first and second opposed generally planar surfaces;
 b) at least one annular optical data storage region disposed on at least one of the first and second surfaces of the card body;
 c) at least one magnetic linear data storage region disposed on at least one of the first and second surfaces;
 d) an optical carriage engaging aperture formed in the card body to engage the card body to a rotatable drive mechanism of an optical data reader;
 e) a semiconductor memory chip embedded in the card body; and
 f) at least one counterbalance weight disposed on the card body, the at least one counterbalance weight configured so as to balance the data storage card when rotated, the counterbalance weight being made of a different material than the card body.

6. A data storage card having optical and magnetic data storage regions, and formed to cooperatively engage both a magnetic stripe reader and an optical data reader, the card comprising:
 a) a card body defining first and second opposed generally planar surfaces;
 b) at least one annular optical data storage region disposed on at least one of the first and second surfaces of the card body;
 c) at least one magnetic linear data storage region disposed on at least one of the first and second surfaces;
 d) an optical carriage engaging aperture formed in the card body to engage a drive mechanism of an optical data reader; and
 e) a spacer attached to at least one of the first and second surfaces, the spacer having an extendible member that selectively projects outward from the at least one of the first and second surfaces, the extendible member engagable with an abutment member of an optical data reader.

7. The data storage card of claim 6, wherein the spacer comprises an anchor and a disk, the anchor being cylindrical and attachable to the optical carriage engaging aperture, and the disk being attached to the anchor and extending from the at least one of the first and second surfaces.

8. The data storage card of claim 6, wherein the spacer comprises a plurality of flaps, each hingedly attached to the at least one of the first and second surfaces, each flap being pivotable between a closed position, wherein the flaps are substantially flush with the at least one of the first and second surfaces, and an open position, wherein the flaps are substantially perpendicular to the at least one of the first and second surfaces.

9. The data storage card of claim 6, wherein the spacer comprises a plurality of wedges that are slidably attached to the card body, each wedge able to slide into a respective cavity within the card by so as to reduce the thickness of a cross sectional profile of the card, and each wedge able to slide out of a respective cavity and extend off of at least one of the first and second surfaces so as to increase the thickness of the cross sectional profile.

10. The data storage card of claim 6, wherein the spacer comprises an extendible region disposed on at least one of the first and second surfaces, the extendible region made out of a material that is electrically resistive and thermally expandable, and wherein the data storage card further comprises a power source which is electrically coupled to the extendible region.

11. The data storage card of claim 10, wherein the power source is embedded into the card body.

12. A data storage card having optical and magnetic data storage regions, and formed to cooperatively engage both a magnetic stripe reader and an optical data reader, the card comprising:
 a) a card body defining first and second opposed generally planar surfaces;
 b) at least one annular optical data storage region disposed on at least one of the first and second surfaces of the card body;
 c) at least one magnetic linear data storage region disposed on at least one of the first and second surfaces;
 d) an optical carriage engaging aperture formed in the card body to engage a drive mechanism of an optical data reader; and
 e) a covering member attached to at least one of the first and second surfaces and extending over the aperture, the covering member being resiliently displaceable away from the aperture to allow engagement of the aperture to a drive mechanism of an optical data reader; and
 f) the covering member comprising a plug and a seal, wherein the seal is connected to at least one of the first and second surfaces and wherein the seal is connected to the plug, wherein the plug is positioned within the optical carriage engaging aperture when the covering member is in a first position and wherein the plug is disposed substantially outside the optical carriage engaging aperture when the covering member is in a second position.

13. The data storage card of claim 12, wherein the plug includes a top surface and a bottom surface, and wherein the seal is attached to the top surface of the plug, and wherein the bottom surface is positioned a first distance above one of the first and second surfaces when the covering member is in the second position.

14. A data storage card having optical and magnetic data storage regions, and formed to cooperatively engage both a magnetic stripe reader and an optical data reader, the card comprising:
 a) a card body defining first and second opposed generally planar surfaces;
 b) at least one annular optical data storage region disposed on at least one of the first and second surfaces of the card body;
 c) at least one magnetic linear data storage region disposed on at least one of the first and second surfaces;
 d) an optical carriage engaging aperture formed in the card body to engage a drive mechanism of an optical data reader; and
 e) a covering member attached to at least one of the first and second surfaces and extending over the aperture, the covering member being resiliently displaceable away from the aperture to allow engagement of the aperture to a drive mechanism of an optical data reader; and
 f) the covering member comprising a seal, wherein the seal is connected to at least one of the first and second surfaces and substantially covers the optical carriage engaging aperture.

15. A data storage card having optical and magnetic data storage regions, and formed to cooperatively engage both a magnetic stripe reader and an optical data reader, the card comprising:
   a) a card body defining first and second opposed generally planar surfaces;
   b) at least one annular optical data storage region disposed on at least one of the first and second surfaces of the card body;
   c) at least one magnetic linear data storage region disposed on at least one of the first and second surfaces;
   d) an optical carriage engaging aperture formed in the card body to engage the card body to a rotatable drive mechanism of an optical data reader;
   e) a semiconductor memory chip embedded in the card body; and
   f) at least one counterbalance weight disposed on the card body, the at least one counterbalance weight configured so as to balance the data storage card when rotated; and
   g) wherein the counterbalance weight is a non-integrally attached member made out of a material different than the card body.

16. The data storage card of claim 15, wherein the counterbalance weight is formed by a counterbalanced distribution of a material that makes up the card body.

17. A data storage card having optical and magnetic data storage regions, and formed to cooperatively engage both a magnetic stripe reader and an optical data reader, the card comprising:
   a) a card body defining first and second opposed generally planar surfaces;
   b) at least one annular optical data storage region disposed on at least one of the first and second surfaces of the card body;
   c) at least one magnetic linear data storage region disposed on at least one of the first and second surfaces;
   d) an optical carriage engaging aperture formed in the card body to engage the card body to a rotatable drive mechanism of an optical data reader;
   e) a semiconductor memory chip embedded in the card body; and
   f) at least one counterbalance weight disposed on the card body, the at least one counterbalance weight configured so as to balance the data storage card when rotated;
   wherein the counterbalance weight is a non-integrally attached member made out of a material different than the card body.

* * * * *